United States Patent
Guo et al.

(10) Patent No.: US 12,537,767 B2
(45) Date of Patent: Jan. 27, 2026

(54) COMMUNICATION METHOD AND APPARATUS

(71) Applicant: Huawei Technologies Co., Ltd., Shenzhen (CN)

(72) Inventors: Bingqing Guo, Beijing (CN); Yongkang Zhang, Nanjing (CN); Dengfeng Gao, Dongguan (CN); Junda Yao, Beijing (CN); Ruyun Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1053 days.

(21) Appl. No.: 17/535,227

(22) Filed: Nov. 24, 2021

(65) Prior Publication Data

US 2022/0174013 A1 Jun. 2, 2022

(30) Foreign Application Priority Data

Nov. 27, 2020 (CN) .......................... 202011359969.X

(51) Int. Cl.
*H04L 45/745* (2022.01)
*H04L 45/02* (2022.01)
*H04L 45/741* (2022.01)

(52) U.S. Cl.
CPC ............. *H04L 45/745* (2013.01); *H04L 45/04* (2013.01); *H04L 45/741* (2013.01)

(58) Field of Classification Search
CPC ..... H04L 45/745; H04L 45/04; H04L 45/741; H04L 45/34; H04L 45/28; H04L 45/64; H04L 45/50; H04L 45/54

See application file for complete search history.

(56) References Cited

U.S. PATENT DOCUMENTS

| | | | | |
|---|---|---|---|---|
| 7,865,615 B2 * | 1/2011 | Mirtorabi | ................ | H04L 12/66 709/242 |
| 11,412,071 B2 * | 8/2022 | Bonica | ................ | H04L 12/4633 |
| 2015/0109902 A1 | 4/2015 | Kumar et al. | | |
| 2018/0077051 A1 | 3/2018 | Nainar et al. | | |
| 2020/0296025 A1 | 9/2020 | Wang | | |
| 2020/0322261 A1 * | 10/2020 | Hu | .......................... | H04L 45/12 |

(Continued)

FOREIGN PATENT DOCUMENTS

| | | |
|---|---|---|
| CN | 108337157 A | 7/2018 |
| CN | 109981458 A | 7/2019 |

(Continued)

OTHER PUBLICATIONS

R. Bonica et al, "Segment Routing Mapped To IPv6 (SRm6)," draft-bonica-spring-sr-mapped-six-01, Apr. 10, 2020, 21 pages.

(Continued)

*Primary Examiner* — Lakeram Jangbahadur
(74) *Attorney, Agent, or Firm* — Conley Rose, P.C.

(57) ABSTRACT

A communication method implemented by a first network device, the method includes receiving, by the first network device, a first packet. The first packet may include a first segment identifier (SID) and a second SID. Determining, by the first network device whether the first SID is unavailable. If the first SID is unavailable, the first network device obtains the second SID based on the first SID, and updates a destination address in the first packet with the second SID, to generate a second packet.

9 Claims, 7 Drawing Sheets

(56) References Cited

U.S. PATENT DOCUMENTS

| | | |
|---|---|---|
| 2021/0029022 A1 | 1/2021 | Hu |
| 2021/0119907 A1 | 4/2021 | Hu et al. |
| 2021/0399985 A1 | 12/2021 | Chen et al. |
| 2021/0409321 A1 | 12/2021 | Li et al. |
| 2022/0255851 A1 | 8/2022 | Hu et al. |

FOREIGN PATENT DOCUMENTS

| | | | | |
|---|---|---|---|---|
| CN | 110661706 A | | 1/2020 | |
| CN | 111541613 A | | 8/2020 | |
| CN | 111682996 A | | 9/2020 | |
| CN | 111901235 A | | 11/2020 | |
| EP | 3716542 A1 | * | 9/2020 | ............. H04L 45/04 |
| JP | 2021507625 A | | 2/2021 | |
| JP | 2022523087 A | | 4/2022 | |
| JP | 2022523184 A | | 4/2022 | |
| WO | WO-2019196653 A1 | * | 10/2019 | ............. H04L 45/12 |
| WO | 2020001309 A1 | | 1/2020 | |
| WO | 2020080056 A1 | | 4/2020 | |
| WO | 2020224503 A1 | | 11/2020 | |

OTHER PUBLICATIONS

H. Chen et al, "SRv6 Midpoint Protection," draft-chen-rtgwg-srv6-midpoint-protection-02, Jun. 2, 2020, 11 pages.

W. Cheng et al, "Generalized SRv6 Network Programming for SRv6 Compression," draft-cl-spring-generalized-srv6-for-cmpr-01, May 20, 2020, 21 pages.

W. Cheng et al, "Generalized SRv6 Network Programming," draft-cl-spring-generalized-srv6-np-01, Mar. 9, 2020, 37 pages.

C. Filsfils, Ed. et al, "Network Programming extension: SRv6 uSID instruction," draft-filsfils-spring-net-pgm-extension-srv6-usid-07, May 19, 2020, 24 pages.

C. Filsfils, Ed. et al, Network Programming extension: SRv6 uSID instruction, draft-filsfils-spring-net-pgm-extension-srv6-usid-12, Dec. 13, 2021, 23 pages.

G. Dawra, Ed. et al, "BGP Link State Extensions for SRv6," draft-ietf-idr-bgpls-srv6-ext-02, Jan. 7, 2020, 28 pages.

C. Filsfils, Ed. et al, "SRv6 Network Programming," draft-ietf-spring-srv6-network-programming-15, Mar. 27, 2020, 45 pages.

W. Cheng, Ed. et al., "Compressed SRv6 Segment List Encoding in SRH," draft-ietf-spring-srv6-srh-compression-01, Mar. 21, 2022, 23 pages.

Z. Li et al, "Generalized Segment Routing Header," draft-lc-6man-generalized-srh-00, Feb. 11, 2020, 24 pages.

* cited by examiner

S401. A first network device obtains first indication information corresponding to a first segment identifier S402. The first network device sends the first indication information

COMMUNICATION METHOD AND APPARATUS

CROSS-REFERENCE TO RELATED APPLICATION

This application claims priority to Chinese Patent Application No. 202011359969.X, filed on Nov. 27, 2020, which is hereby incorporated by reference in its entirety.

TECHNICAL FIELD

This application relates to the communication field, and in particular, to a communication method and apparatus.

BACKGROUND

Following Multiprotocol Label Switching (MPLS) technology and segment routing (SR) technology, to adapt to network development, an SR over Internet Protocol (IP) version 6 (IPv6) (SRv6) technology is provided. With the SRv6 technology, an SRv6 packet has a routing attribute and a programmable attribute, so that the SRv6 packet can be flexibly applied to various service scenarios.

However, if a segment identifier in the SRv6 packet is unavailable due to a failure of a network device or a link, the SRv6 packet cannot be further processed. In this case, communication reliability is affected.

SUMMARY

Embodiments of this application provide a communication method and apparatus, so that a problem that an SRv6 packet cannot be further processed because a segment identifier is unavailable can be resolved, and communication reliability is improved.

To achieve the foregoing objectives, the following technical solutions are used in this application.

According to a first aspect, a communication method is provided. The communication method may include a first network device configured to receive a first packet. The first packet may include a first segment identifier and a second segment identifier. If the first segment identifier is unavailable, the first network device obtains the second segment identifier based on the first segment identifier, and updates a destination address in the first packet with the second segment identifier, to generate a second packet. In this way, the first network device can process the second packet based on the second segment identifier.

The first packet and the second packet may be SRv6 packets.

The first segment identifier and the second segment identifier may be identifiers of corresponding network devices in a network or subnet.

Further, the first segment identifier and the second segment identifier may be segment identifiers of a same network device. For example, both the first segment identifier and the second segment identifier are segment identifiers of the first network device or a second network device. Alternatively, the first segment identifier and the second segment identifier may be segment identifiers of different network devices. For example, the first segment identifier is a segment identifier of the first network device, and the second segment identifier is a segment identifier of a second network device, or the first segment identifier is a segment identifier of a second network device, and the second segment identifier is a segment identifier of a third network device.

In an embodiment, the first segment identifier may be unavailable due to a failure of a network device corresponding to the first segment identifier, a failure of a link to the network device, an error of the first segment identifier, or the like.

In an embodiment, the first network device processes the second packet based on the second segment identifier by performing one of the following: parsing, discarding, or forwarding the second packet.

According to the communication method in the first aspect, because the first network device can obtain the second segment identifier based on the first segment identifier that is unavailable, the first network device properly updates the destination address in the first packet with the second segment identifier, to obtain the second packet. In this way, the first network device can further process the second packet based on the second segment identifier, for example, send the second packet to a network device corresponding to the second segment identifier, so that a problem that an SRv6 packet cannot be further processed because a segment identifier is unavailable is resolved, and communication reliability is improved.

In a possible design, a length of the first segment identifier and a length of the second segment identifier are different. In this way, the destination address can be updated in a scenario of hybrid orchestration, so that a packet forwarding operation continues, and communication reliability is further improved.

Optionally, the first segment identifier and/or the second segment identifier are compressed segment identifiers. In this way, a data packet size of the first packet can be reduced, resource overheads can be reduced, and communication efficiency can be improved.

In a possible design, the first network device obtains the second segment identifier based on the first segment identifier by obtaining first indication information corresponding to the first segment identifier, and obtaining the second segment identifier based on the first indication information. The first indication information is used to indicate a format of the second segment identifier. In this way, the first network device can obtain the second segment identifier based on the first indication information in a quick and accurate manner. This improves processing efficiency and further improves communication efficiency.

Optionally, the first indication information is used to indicate a length of the second segment identifier, or the first indication information is used to indicate whether the second segment identifier is compressed. In this way, an indication manner of the first indication information may be flexibly selected based on an actual scenario, to improve applicability.

Optionally, the method according to the first aspect may further include the first network device receiving an advertisement message. The advertisement message carries the first indication information. In this way, the first indication information may be sent by multiplexing the advertisement message, to further reduce resource overheads and improve communication efficiency.

In an embodiment, the advertisement message further carries second indication information. The second indication information indicates to the first network device to store the first indication information. In this way, the first network device does not need to obtain the first indication information from another network device for using each time. This reduces signaling overheads, and further improves communication efficiency.

In an embodiment, the advertisement message carries third indication information and fourth indication information. The third indication information indicates a format of the first segment identifier, and the fourth indication information indicates to the first network device to store the third indication information. In this way, when the first segment identifier is available, the first network device may further update a destination address with the first segment identifier based on the third indication information. Communication reliability is further improved.

Still further, after the first network device updates the destination address in the first packet with the second segment identifier to generate the second packet, the method according to the first aspect may further include deleting, by the first network device, the stored third indication information. This can improve resource utilization and communication efficiency.

Optionally, the advertisement message further carries fifth indication information and sixth indication information. The fifth indication information indicates a format of a third segment identifier, and the sixth indication information indicates to the first network device not to store the fifth indication information. In this way, the first network device may avoid storing redundant information, so that resource utilization is improved, and communication efficiency is improved.

Further, the advertisement message may include one or more of the following: a Border Gateway Protocol-Link State (BGP-LS) message or an Interior Gateway Protocol (IGP) routing message. It may be understood that, the advertisement message is sent by multiplexing the BGP-LS message or the IGP routing message, so that signaling overheads can be reduced, and communication efficiency can be improved.

In a possible design, the second segment identifier may be the segment identifier of the second network device, and the first network device processes the second packet based on the second segment identifier by sending the second packet to the second network device based on the second segment identifier. In this way, the first network device may continue to perform packet forwarding, and communication reliability is further improved.

According to a second aspect, a communication method is provided. The communication method may include obtaining and sending, by a first network device, first indication information corresponding to a first segment identifier. The first indication information indicates a format of a second segment identifier.

According to the communication method in the second aspect, the first network device sends the first indication information so that a second network can receive the first indication information. In this way, if the first segment identifier in a first packet is unavailable, the second network device can obtain the second segment identifier in the first packet based on the format indicated by the first indication information, and properly update a destination address in the first packet with the second segment identifier, to obtain a second packet. In this way, the second network device may further process the second packet based on the second segment identifier, and resolving a problem that an SRv6 packet cannot be further processed because a segment identifier is unavailable. Communication reliability is therefore improved.

In a possible design, the first indication information indicates a length of the second segment identifier, or the first indication information indicates whether the second segment identifier is compressed.

Optionally, a length of the first segment identifier and the length of the second segment identifier are different.

Further, the first segment identifier and/or the second segment identifier are compressed segment identifiers.

In a possible design, the first network device sends the first indication information in an advertisement message.

Optionally, the advertisement message further carries second indication information. The second indication information indicates to a network device that receives the first indication information to store the first indication information.

Optionally, the advertisement message further carries third indication information and fourth indication information. The third indication information indicates a format of the first segment identifier, and the fourth indication information indicates to a network device that receives the third indication information to store the third indication information.

Optionally, the advertisement message further carries fifth indication information and sixth indication information. The fifth indication information indicates a format of a third segment identifier, and the sixth indication information indicates to a network device that receives the fifth indication information not to store the fifth indication information.

Optionally, the advertisement message may include one or more of the following: a BGP-LS message or an IGP routing message.

In addition, for technical effects of the communication method according to the second aspect, refer to the technical effects of the communication method according to the first aspect.

According to a third aspect, a communication apparatus is provided. The communication apparatus may include a transceiver module and a processing module. The transceiver module is configured to receive a first packet, where the first packet includes a first segment identifier and a second segment identifier. If the first segment identifier is unavailable, the processing module is configured to obtain the second segment identifier based on the first segment identifier, update a destination address in the first packet with the second segment identifier, to generate a second packet, and process the second packet based on the second segment identifier.

In a possible design, a length of the first segment identifier and a length of the second segment identifier are different.

Optionally, the first segment identifier and/or the second segment identifier are compressed segment identifiers.

In a possible design, the processing module is further configured to obtain first indication information corresponding to the first segment identifier, and obtain the second segment identifier based on the first indication information. The first indication information indicates a format of the second segment identifier.

Optionally, the first indication information indicates the length of the second segment identifier, or the first indication information indicates that the second segment identifier is the compressed segment identifier.

Optionally, the transceiver module is further configured to receive an advertisement message. The advertisement message carries the first indication information.

Further, the advertisement message further carries second indication information. The second indication information indicates to the first network device to store the first indication information.

Further, the advertisement message carries third indication information and fourth indication information. The third indication information indicates a format of the first segment identifier, and the fourth indication information indicates to the first network device to store the third indication information.

Further, the advertisement message carries fifth indication information and sixth indication information. The fifth indication information indicates a format of a third segment identifier, and the sixth indication information indicates to the first network device not to store the fifth indication information.

Further, the advertisement message may include one or more of the following: a BGP-LS message or an IGP routing message.

Still further, after updating the destination address in the first packet with the second segment identifier to generate the second packet, the processing module is further configured to delete the stored third indication information.

In a possible design, the processing module is further configured to control, based on the second segment identifier, the transceiver module to send the second packet to a second network device.

Optionally, the transceiver module may include a sending module and a receiving module. The sending module is configured to implement a sending function of the apparatus according to the third aspect, and the receiving module is configured to implement a receiving function of the apparatus.

Optionally, the apparatus according to the third aspect may further include a storage module, and the storage module stores a program or instructions. When the processing module executes the program or the instructions, the apparatus can perform the method according to the first aspect.

It should be noted that, the apparatus according to the third aspect may be a network device, a chip (system) or another part or component that may be disposed on the network device, or an apparatus that includes the network device. This is not limited in this application.

In addition, for technical effects of the apparatus according to the third aspect, refer to the technical effects of the method according to the first aspect.

According to a fourth aspect, a communication apparatus is provided. The communication apparatus may include a processing module and a transceiver module. The processing module is configured to obtain first indication information corresponding to a first segment identifier. The transceiver module is configured to send the first indication information. The first indication information indicates a format of a second segment identifier.

In a possible design, the first indication information indicates a length of the second segment identifier, or the first indication information indicates whether the second segment identifier is compressed.

In a possible design, a length of the first segment identifier and the length of the second segment identifier are different.

Optionally, the first segment identifier and/or the second segment identifier are compressed segment identifiers.

In a possible design, the transceiver module is further configured to send an advertisement message. The advertisement message carries the first indication information.

Optionally, the advertisement message further carries second indication information. The second indication information indicates a network device that receives the first indication information to store the first indication information.

Optionally, the advertisement message further carries third indication information and fourth indication information. The third indication information indicates a format of the first segment identifier, and the fourth indication information indicates a network device that receives the third indication information to store the third indication information.

Optionally, the advertisement message further carries fifth indication information and sixth indication information. The fifth indication information indicates a format of a third segment identifier, and the sixth indication information indicates to a network device that receives the fifth indication information not to store the fifth indication information.

Optionally, the advertisement message may include one or more of the following: a BGP-LS message or an IGP routing message.

Optionally, the transceiver module may include a sending module and a receiving module. The sending module is configured to implement a sending function of the apparatus according to the fourth aspect, and the receiving module is configured to implement a receiving function of the apparatus.

Optionally, the apparatus according to the fourth aspect may further include a storage module, and the storage module stores a program or instructions. When the processing module executes the program or the instructions, the apparatus can perform the method according to the second aspect.

It should be noted that, the apparatus according to the fourth aspect may be a network device, a chip (system) or another part or component that may be disposed on the network device, or an apparatus that includes the network device. This is not limited in this application.

In addition, for technical effects of the apparatus according to the fourth aspect, refer to the technical effects of the method according to the second aspect.

According to a fifth aspect, a communication apparatus is provided. The communication apparatus may include a processor, and the processor is coupled to the memory. The processor is configured to execute a computer program stored in the memory, so that the apparatus performs the method according to the first aspect or the second method.

In a possible design, the apparatus according to the fifth aspect may further include a communication interface. The communication interface may be a transceiver, and may be used by the apparatus according to the fifth aspect to communicate with another communication apparatus.

In this application, the apparatus according to the fifth aspect may be a network device, a chip (system) or another part or component that may be disposed on the network device, or an apparatus that includes the network device.

In addition, for technical effects of the apparatus according to the fifth aspect, refer to the technical effects of the method according to the first aspect or the second aspect.

According to a sixth aspect, a communication apparatus is provided. The communication apparatus may include a processor and a memory. The memory is configured to store computer instructions. When the processor executes the instructions, the apparatus performs the communication method according to the first aspect or the second aspect.

In a possible design, the apparatus according to the sixth aspect may further include a communication interface. The communication interface may be a transceiver, and may be used by the apparatus according to the fifth aspect to communicate with another communication apparatus.

In this application, the apparatus according to the sixth aspect may be a network device, a chip (system) or another part or component that may be disposed on the network device, or an apparatus that includes the network device.

In addition, for technical effects of the apparatus according to the sixth aspect, refer to the technical effects of the method according to the first aspect or the second aspect.

According to a seventh aspect, a communication apparatus is provided. The communication apparatus may include a processor and an interface circuit. The interface circuit is configured to receive code instructions and transmit the code instructions to the processor. The processor is configured to run the code instructions to perform the method according to the first aspect or the second aspect.

Optionally, the apparatus according to the seventh aspect may further include a communication interface. The communication interface may be a transceiver, and may be used by the apparatus according to the fifth aspect to communicate with another communication apparatus.

Optionally, the apparatus according to the seventh aspect may further include a memory, and the memory stores a program or instructions. When the processor according to the seventh aspect executes the program or the instructions, the apparatus can perform the method according to the first aspect or the second aspect.

In this application, the apparatus according to the seventh aspect may be a network device, a chip (system) or another part or component that may be disposed on the network device, or an apparatus that includes the network device.

In addition, for technical effects of the apparatus according to the seventh aspect, refer to the technical effects of the method according to the first aspect or the second aspect.

According to an eighth aspect, a communication apparatus is provided. The communication apparatus may include a processor and a communication interface. The communication interface is configured to exchange information between the apparatus and another apparatus, and the processor executes program instructions to perform the method according to the first aspect or the second aspect.

Optionally, the communication interface may be a transceiver, and the transceiver may be a transceiver circuit or an interface circuit, and may be used by the apparatus according to the eighth aspect to communicate with another communication apparatus.

Optionally, the apparatus according to the eighth aspect may further include a memory, and the memory stores a program or instructions. When the processor according to the eighth aspect executes the program or the instructions, the apparatus can perform the communication method according to the first aspect or the second aspect.

In this application, the apparatus according to the eighth aspect may be a network device, a chip (system) or another part or component that may be disposed on the network device, or an apparatus that includes the network device.

In addition, for technical effects of the apparatus according to the eighth aspect, refer to the technical effects of the method according to the first aspect or the second aspect.

According to a ninth aspect, a communication system is provided. The communication system includes one or more network devices, where the network device is configured to perform the communication method according to the first aspect or the second aspect.

According to a tenth aspect, a computer-readable storage medium is provided. The computer-readable storage medium may include a computer program or instructions. When the computer program or instructions is or are run on a computer, the computer is enabled to perform the method according to the first aspect or the second aspect.

According to an eleventh aspect, a computer program product is provided. The computer program product may include a computer program or instructions. When the computer program or instructions is or are run on a computer, the computer is enabled to perform the method according to the first aspect or the second aspect.

DESCRIPTION OF EMBODIMENTS

First, technical terms in embodiments of this application are described.

1. SRv6:

SR is a protocol designed based on source routing to forward a data packet on a network. The SR divides a network path into segments, and allocates SIDs to the segments and network nodes. A SID list (or a label stack in SR-MPLS) may be obtained by sorting the SIDs sequentially. The SID list may indicate a forwarding path. According to an SR technology, a node and a path that a data packet carrying the SID list passes through can be specified, to meet a traffic optimization requirement. To make an analogy, a data packet can be compared to luggage, and the SR may be compared to a label on the luggage. If the luggage is to be sent from a region A to a region D through a region B and a region C, a label "Go to the region B first, then the region C, and eventually the region D" may be put on the luggage at the region A, namely, a starting location. In this way, each region simply identifies the label on the luggage and forwards the luggage from one region to another region based on the label.

According to the SR technology, a source node adds a label to a data packet, and an intermediate node may forward the data packet to a next node based on the label until the data packet arrives at a destination node. For example, <SID 1, SID 2, SID 3> is inserted into a packet header of a data packet, and the data packet is first forwarded to a node corresponding to the SID 1, then forwarded to a node corresponding to the SID 2, and then forwarded to a node corresponding to the SID 3.

SRv6 indicates applying the SR technology to an IPv6 network. An IPv6 address (128 bits) is used as a representation of a SID. When forwarding a data packet, a network device that supports the SRv6 searches a local SID table based on a destination address (DA) in the data packet. When any SID in the local SID table is the longest match for the destination address in the data packet, an operation corresponding to a policy related to the SID in the local SID table is performed according to the policy. For example, the data packet may be forwarded through an outbound interface corresponding to the SID. If no SID in the local SID table is the longest match for the destination address in the data packet, an IPv6 forwarding table is searched, and longest match forwarding is performed based on the IPv6 forwarding table.

2. SID:

The SID may be an identifier of a corresponding network device in a network or subnet. In other words, if an SRv6 packet is to be sent to a network device, a SID of the network device may be carried in a DA field in the SRv6 packet.

Figure 1:
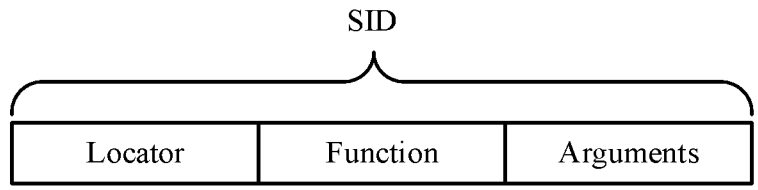
FIG. 1 is a schematic diagram of a structure of a segment identifier (SID) according to an embodiment of this application.

As shown in FIG. 1, the SID may be an IPv6 address of 128 bits, and may include the following fields: locator, function, and arguments. The following describes each field.

a. Locator:

The locator may include an address of a network/subnet and an address of a corresponding network device. The address of the network/subnet is usually allocated by a carrier, so that in SIDs of network devices in a same network/subnet, addresses of the same network/subnet are the same, and addresses of the network devices are different.

Optionally, a network device may publish, based on an IGP, an advertisement message that carries a locator of the network device, so that another network device in a same network or subnet as the network device forwards an SRv6 packet to the network device based on the locator.

Optionally, the network device may further receive, based on the IGP, a locator from a second network device in the network or subnet, so that the network device forwards an SRv6 packet to the second network device based on the locator.

b. Function Field:

The function field indicates to a network device to perform a corresponding forwarding action, for example, forward an SRv6 packet to a specified link or search a specified table for packet forwarding. The function field is a programmable field. By editing the function field, the forwarding action performed by the network device may be adjusted correspondingly.

c. Arguments Field:

The arguments field is optional. The argument field may include an argument for a network device to perform a forwarding action, and the argument may be a flow, a service, or other related variable information.

3. G-SID:

To reduce resource overheads and improve communication efficiency, a SID of 128 bits may be compressed into a G-SID. A size of the G-SID may be 16 bits or 32 bits.

Figure 2:
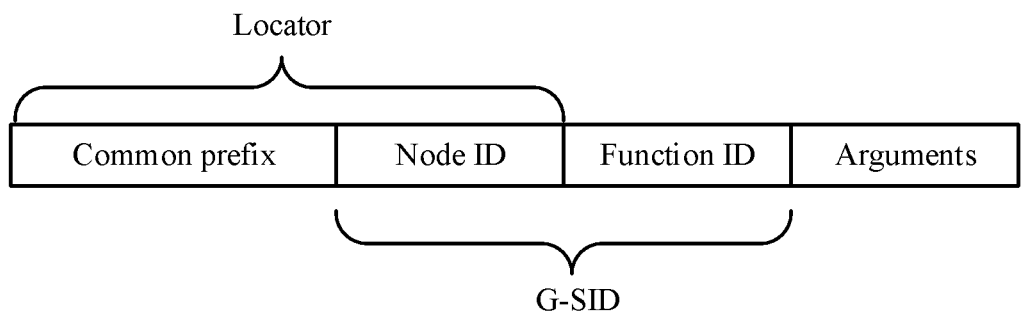
FIG. 2 is a schematic diagram of a structure of a generalized SID (G-SID) according to an embodiment of this application.

Further, in FIG. 1, addresses of networks/subnets in SIDs of network devices in a same network/subnet are the same. Therefore, the addresses of the network/subnets in the SIDs are considered to be duplicate and redundant parts. In this case, the address of the network/subnet in the SID can be deleted to compress the SID, and a G-SID shown in FIG. 2 is obtained. As shown in FIG. 2, a locator consists of a common prefix and a node ID. After the common prefix, namely, the address of the subnet or the network, is deleted from the SID, the SID consisting of the node ID and a function ID is called the G-SID.

4. Traffic Engineering Fast Reroute (TE-FRR):

After a network device receives an SRv6 packet, if a G-SID or a SID of a next hop in the SRv6 packet is unreachable, the network device may update a destination address in the SRv6 packet with a subsequently reachable G-SID or SID, to further process the SRv6 packet.

The following describes technical solutions of this application with reference to accompanying drawings.

The technical solutions in the embodiments of this application may be applied to a communication system, for example, a broadband access system, a metro access system, or a backbone network system, or may be applied to a wireless communication system, for example, a vehicle to everything (V2X) communication system, a device-to-device (D2D) communication system, an Internet of vehicles communication system, a 4th generation (4G) mobile communication system such as a Long-Term Evolution (LTE) system, a 5th generation (5G) mobile communication system such as a New Radio (NR) system, and a future communication system such as a 6th generation (6G) mobile communication system.

Each aspect, embodiment, or feature is presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in the embodiments of this application, the terms such as "for example" and "such as" are used to represent giving an example, an illustration, or a description. Any embodiment or design scheme described as an "example" in this application should not be explained as being more preferred or having more advantages than another embodiment or design scheme. Further, the term "example" is used to present a concept in a specific manner.

In the embodiments of this application, the terms "information", "signal", "message", "channel", and "signaling" may sometimes be interchangeably used. It should be noted that, meanings expressed by the terms are consistent when differences between the terms are not emphasized. "Of", "relevant", and "corresponding" may be interchangeably used sometimes. It should be noted that meanings expressed by the terms are consistent when differences between the terms are not emphasized.

In the embodiments of this application, sometimes a subscript in, for example, $W_1$ may be written in an incorrect form such as W1. Meanings to be expressed are consistent when differences are not emphasized.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may be aware that the technical solutions provided in the embodiments of this application are also applicable to a similar technical problem as the network architecture evolves and a new service scenario emerges.

Figure 3:
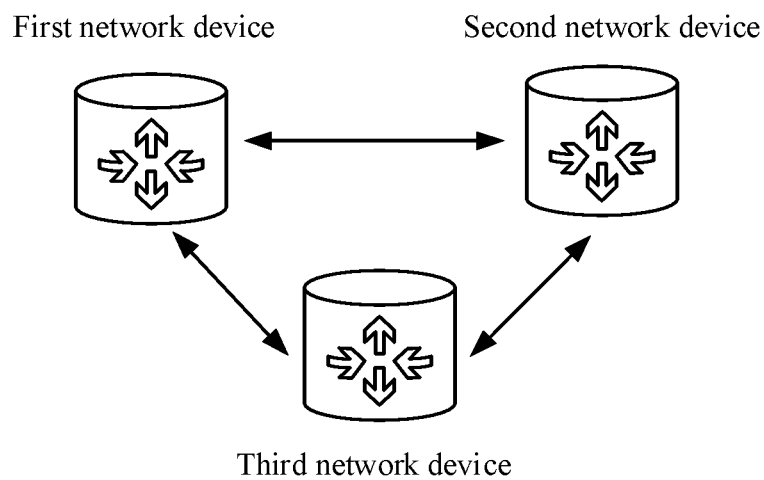
FIG. 3 is a schematic diagram of an architecture of a communication system according to an embodiment of this application.

For ease of understanding the embodiments of this application, a communication system shown in FIG. 3 is first used as an example to describe in detail a communication system to which the embodiments of this application are applicable. For example, FIG. 3 is a schematic diagram of an architecture of a communication system to which the communication method according to the embodiments of this application is applicable.

As shown in FIG. 3, the communication system includes a plurality of network devices, such as a first network device, a second network device, and a third network device.

The network device is a device that is located on a network side of the communication system and that has a transceiver function, or a chip (system) or another part or component that may be disposed on the device.

The network device may be a physical device that supports a routing or switching function, such as a router, a switch, or a gateway, may be a virtual device that supports route advertisement and packet forwarding, or the like. The network device may be a controller in a communication network, or may be a node in the communication network.

It should be noted that, the communication method provided in the embodiments of this application may be applicable to any plurality of network devices shown in FIG. 3. For specific implementation, refer to the following method embodiments.

It should be noted that, the solutions in the embodiments of this application may also be used in another communication system, and a corresponding name may also be replaced with a name of a corresponding function in the other communication system.

It should be understood that, FIG. 3 is merely a simplified schematic diagram of an example for ease of understanding. The communication system may further include another network device and/or another terminal device that are or is not shown in FIG. 3.

The following describes in detail the communication method provided in the embodiments of this application with reference to FIG. 4 to FIG. 8.

For example, the communication method provided in the embodiments of this application may be applicable to a plurality of network devices in the communication system shown in FIG. 3, for example, applicable to communication between a first network device, a second network device, and a third network device.

Figures 4, 5:
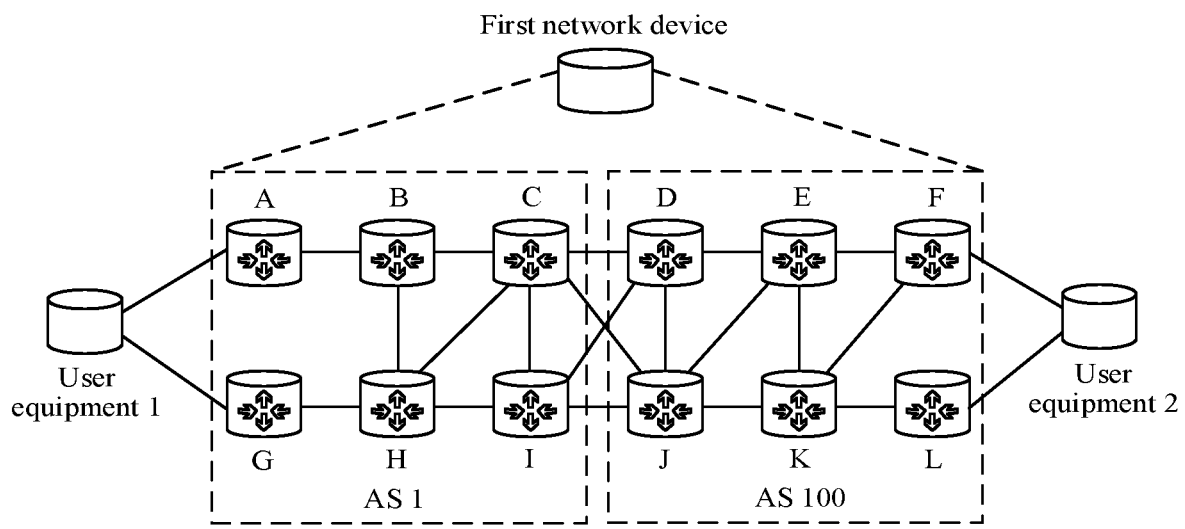
FIG. 4 is a flowchart of a communication method according to an embodiment of this application.
FIG. 5 is a schematic diagram of an architecture of a communication network in a communication method according to an embodiment of this application.

For example, FIG. 4 is a flowchart of a communication method according to an embodiment of this application. The communication method may be performed by a first network device, and the first network device may be a controller or a node in the communication system shown in FIG. 3. As shown in FIG. 4, the communication method includes the following steps.

S401. The first network device obtains first indication information corresponding to a first segment identifier.

The first indication information has a correspondence with the first segment identifier, in other words, corresponds to the first segment identifier. The first indication information may be used to indicate a format of a second segment identifier, and may be alternatively referred to as format indication information.

In addition, the first segment identifier and the second segment identifier are two upstream and downstream segment identifiers that are adjacent to each other on a communication link. In other words, when a forwarding path is represented by using a SID list, it may be considered that, the first SID is a SID first executed in the SID list, and the second SID is a SID adjacent to the first SID and executed after the first SID.

In a possible design, the first network device may obtain format indication information corresponding to each node in a network or subnet by using an advertisement message.

In an example, the first network device serves as a controller, and each node in the network or subnet may use an advertisement message such as a BGP-LS message or a Path Computation Element Communication Protocol (PCEP) message, to actively report format indication information corresponding to a SID of the node to the first network device.

In another example, as a node in the network or subnet, the first network device may receive routing information sent by another network device as an advertisement message, and obtain the first indication information corresponding to the first SID from the routing information. The routing information may be, for example, IGP routing information, such as Intermediate System to Intermediate System (ISIS) routing information, Open Shortest Path First (OSPF) routing information, or BGP routing information.

The format indication information may correspond to the SID of the node, to indicate a format of a next SID adjacent to the SID of the node. The SID of the node may be a G-SID or a standard SID.

The format indication information may be used to indicate a length of a SID, or used to indicate whether a SID is compressed. In this way, an indication manner of the format indication information may be flexibly selected based on an actual scenario, to improve applicability.

For example, the format indication information may indicate the length by using a usflavor field whose length is 8 bits. The usflavor field may be a first indication value, for example, 0000 0000, to indicate that a length of a corresponding SID is 128 bits. Alternatively, the usflavor field may be a second indication value, for example, 0000 0010, to indicate that a length of a corresponding SID is 32 bits. Alternatively, the usflavor field may be a third indication value, for example, 0000 0001, to indicate that a length of a corresponding SID is 16 bits.

For another example, the format indication information may alternatively use a next SID field to indicate whether a SID is compressed. The next SID field may be a first length value, for example, 128, to indicate that a length of a corresponding SID is uncompressed and is 128 bits. Alternatively, the next SID field may be a second length value, for example, 32, to indicate that a length of a corresponding SID is compressed and is 32 bits. Alternatively, the next SID field may be a third length value, for example, 16, and may be directly used to indicate that a length of a corresponding SID is compressed and is 16 bits.

It should be noted that, if a SID list used to indicate a communication link or a forwarding path includes: (a fourth SID, a third SID, a first SID, and a second SID), the format indication information obtained by the first network device may include one or more of the following: first indication information, third indication information, or fifth indication information.

The third SID corresponds to the third indication information, in other words, the third indication information indicates a next SID of the third SID, to be specific, to indicate a format of the first SID. The fifth indication information corresponds to the fourth SID, in other words, the third indication information indicates a next SID of the third SID, to be specific, to indicate a format of the third SID.

It should be understood that, the foregoing values of the format indication information do not constitute a limitation. In actual application, a value of the format indication information may be correspondingly adjusted based on an actual situation. In addition, the format indication information may be further used to indicate a location relationship of an adjacent SID in a SRv6 packet.

In another possible design, the first network device may further obtain format indication information of a node in a network or subnet by using a query message or a status report message.

Optionally, the first network device may send, at a granularity of a network or subnet, a query message to a network or subnet, for example, send a configuration management (e.g., Network Configuration Protocol (NETCONF)) query packet. In this way, each node in the network or subnet may report format indication information corresponding to a SID of the node to the first network device based on the query message.

Optionally, the first network device may alternatively send, at a granularity of a communication link or a forwarding path, a query message to a specified communication link or a specified forwarding path in a network or subnet, for example, send a NETCONF query packet.

In this way, a node on the specified communication link or the specified forwarding path may report, to the first network device based on the query message, format indication information corresponding to a SID of the node. One communication link or one forwarding path may include only nodes in a same network or subnet, or may include nodes in a plurality of networks or subnets. In other words, a communication link or a forwarding path may be within a network or subnet, or may be across networks or subnets. This is not limited in this embodiment of this application.

Optionally, the first network device may further send, at a granularity of a node, a query message to a specified node in a network or subnet, for example, send a NETCONF query packet. In this way, the specified node may report, to the first network device based on the query message, format indication information corresponding to a SID of the specified node.

In this way, the first network device may flexibly select a corresponding granularity to deliver format indication information based on an actual situation, to improve applicability.

For example, the following uses a network shown in FIG. 5 as an example for description.

Referring to FIG. 5, a first network device serves as a controller of autonomous systems (ASs) AS 1 and AS 100. The AS 1 includes a node A, a node B, a node C, a node H, a node G, and a node I. The AS 100 includes a node C, a node D, a node E, a node J, a node K, and a node L.

The node A is connected to the node B. The node G is connected to the node H. The node B is connected to the node H and the node C. The node H is connected to the node C and the node I. The node C is connected to the node I, the node D, and the node J. The node I is connected to the node D and the node J. The node D is connected to the node J and the node E. The node J is connected to the node E and the node K. The node E is connected to the node K and the node F. The node K is connected to the node F and the node L.

In addition, user equipment (UE) 1 and UE 2 establish a communication link L1: node G→node H→node node J→node K→node L.

Optionally, the node A to the node L may actively report their respective format indication information to the first network device by using an advertisement message, or the first network device may send a query message to the entire AS 1 and the entire AS 100, and receive format indication information from each node in the AS 1 and the AS 100. In this way, the first network device may obtain respective format indication information of the node A to the node L.

Optionally, the first network device may send a query message to the communication link L1, to obtain respective format indication information of the node G to the node L on the communication link L1.

Optionally, because the node B to the node E are connected to the communication link L1, the first network device may further send a query message to the node B to the node E, to obtain respective format indication information of the node B to the node E.

S402. The first network device sends the first indication information.

For example, the first network device may send, based on a SID on a communication link, an advertisement message to a network or subnet, to a specified link in the network or subnet, or to a specified node in the network or subnet, so that a corresponding node obtains format indication information of a downstream SID of the node, and TE-FRR is correctly performed based on the format indication information.

The advertisement message may carry one or more pieces of format indication information, for example, carry one or more of the following: first indication information, third indication information, and fifth indication information.

The advertisement message may include one or more of the following: a BGP-LS message or an IGP routing message.

Optionally, to ensure that a node can perform correct forwarding behavior, the advertisement message may further carry forwarding behavior information. The forwarding behavior information may be used to indicate a node to perform forwarding behavior, for example, perform data plane forwarding, or send to a control plane for processing and perform forwarding.

Optionally, to ensure that a corresponding node can receive a corresponding advertisement message, each advertisement message may carry an identity (ID) of the corresponding node, for example, an IGP Router-ID of the node.

Optionally, the advertisement message may include an attribute type-length-value (TLV) and network layer reachability information (NLRI). The format indication information and the forwarding behavior information may be carried in an SRv6 SID attributes TLV, and the ID of the node may be carried in the NLRI.

The following separately describes three manners: sending, by the first network device, an advertisement message to a network or subnet, sending an advertisement message to a specified link, or sending an advertisement message to a specified node.

A. Sending an Advertisement Message to a Network or Subnet:

In a possible design, the first network device may determine, based on a SID on a communication link, format indication information corresponding to the SID, and determine forwarding behavior information of each node based on configuration information of each node on the communication link. In this way, the first network device may send the advertisement message to all nodes in the network or subnet, so that each node may store the format indication information and the forwarding behavior information in the advertisement message.

For example, an upstream-downstream relationship between SIDs on a communication link includes: a fourth SID→a third SID→a first SID→a second SID. The first network device may determine first indication information, third indication information, fifth indication information, and forwarding behavior information of each node on the communication link.

In this way, the first network device may send each node in the network or subnet an advertisement message that carries the first indication information, the third indication information, the fifth indication information, and the forwarding behavior information.

It should be understood that, that the first network device sends corresponding format indication information based on the SID, and sends corresponding forwarding behavior information based on the configuration information is an example manner, and does not constitute a limitation. For example, the first network device may further send all format indication information and forwarding behavior information in the network or subnet to each node.

For example, the following continues to use the network shown in FIG. 5 as an example for description.

When the first network device has a service, the first network device may establish a communication link L2: node A→node B→node C→node D→node E→node F, and send a BGP-IPv6 segment routing policy (BGP-SRv6 policy) or a PCEP message to the node A, so that the node A establishes a corresponding tunnel.

The BGP-SRv6 policy or the PCEP message may carry path information of the communication link L2, where the path information may be: SID list (list)=<End-x_A, End-x_B, End-x_C, End-x_D, End-x_E, End-x_F>, and an order of the node A to the node F in the SID list may indicate an upstream-downstream relationship of the node A to the node F.

Further, based on respective SIDs of the node A to the node F on the communication link L2, the first network device may carry, in a BGP-LS message, format indication information B to format indication information F and forwarding behavior information of the node A to the node E, and sends the BGP-LS message to each node in the AS 1 and the AS 100.

The format indication information B corresponds to a SID A of the node A, and indicates a format of a SID B of the node B. The format indication information C corresponds to the SID B of the node B, and indicates a format of a SID C of the node C. The format indication information D corresponds to the SID C of the node C, and indicates a format of a SID D of the node D. The format indication information E corresponds to the SID D of the node D, and indicates a format of a SID E of the node E. The format indication information F corresponds to the SID E of the node E, and indicates a format of a SID F of the node F.

For example, in an example, format indication information and forwarding behavior information stored by each node in the AS 1 and the AS 100 may be shown in the following Table 1a.

Table 1a

| Forwarding behavior information (auiSidAddr) | Format indication information (usflavor) | Description of the format indication information |
| --- | --- | --- |
| End-x_A | 0000 0000 | The format indication information indicates that a format of a next SID of End-x_A is an uncompressed format, and occupies 128 bits. |
| End-x_B | 0000 0010 | The format indication information indicates that a format of a next SID of End-x_B is a compressed format, and a length of the SID is a default length, for example, 32 bits. |
| End-x_C | 0000 0000 | The format indication information indicates that a format of a next SID of End-x_C is an uncompressed format, and occupies 128 bits. |
| End-x_D | 0000 0010 | The format indication information indicates that a format of a next SID of End-x_D is a compressed format, and a length of the SID is a default length, for example, 32 bits. |
| End-x_E | 0000 0010 | The format indication information indicates that a format of a next SID of End-x_E is a compressed format, and a length of the SID is a default length, for example, 32 bits. |

For another example, in another example, format indication information and forwarding behavior information stored by each node in the AS 1 and the AS 100 may be shown in the following Table 1b.

Table 1b

| Forwarding behavior information (auiSidAddr) | Format indication information (usflavor) | Description of the format indication information |
| --- | --- | --- |
| End-x_A | 0 or 128 | The format indication information: 0 or 128 indicates that a format of a next SID of End-x_A is an uncompressed format, and occupies 128 bits. |

Table 1b-continued

| Forwarding behavior information (auiSidAddr) | Format indication information (usflavor) | Description of the format indication information |
|---|---|---|
| End-x_B | 32 | The format indication information indicates that a format of a next SID of End-x_B is a compressed format, and occupies 32 bits. |
| End-x_C | 0 or 128 | The format indication information indicates that a format of a next SID of End-x_C is an uncompressed format, and occupies 128 bits. |
| End-x_D | 16 | The format indication information indicates that a format of a next SID of End-x_D is a compressed format, and occupies 16 bits. |
| End-x_E | 64 | The format indication information indicates that a format of a next SID of End-x_D is a compressed format, and occupies 16 bits. |

In another possible design, the advertisement message sent by the first network device to all nodes in the network or subnet may carry not only the format indication information and the forwarding behavior information, but also storage indication information corresponding to the format indication information, to indicate whether a node stores the format indication information. For example, the storage indication information may be carried in an sflag field in an SRv6 SID attributes TLV.

For example, a value of the sflag field may be a first value, for example, 1, and indicates the node to store corresponding format indication information in the advertisement message. A value of the sflag field may be a second value, for example, 0, and indicates the node not to store corresponding format indication information in the advertisement message.

In this way, on one hand, the node does not need to obtain format indication information from another network device each time the node uses the format indication information. This reduces signaling overheads, and further improves communication efficiency. On the other hand, a node in the network or subnet may be specified to store the format indication information. This avoids information redundancy.

For example, because the upstream-downstream relationship between SIDs on the communication link includes: the fourth SID→the third SID→the first SID→the second SID, the storage indication information determined by the first network device may include second indication information, fourth indication information, and sixth indication information.

The second indication information may be used to indicate whether a node that receives the advertisement message stores the first indication information, the fourth indication information may be used to indicate whether a node that receives the advertisement message stores the third indication information, and the sixth indication information may be used to indicate whether a node that receives the advertisement message stores the fifth indication information.

Optionally, for advertisement messages sent to different nodes, values of storage indication information in the advertisement messages are correspondingly different, to indicate the different nodes to perform different actions.

For example, in an advertisement message sent to the first node, values of the second indication information, the fourth indication information, and the sixth indication information are all first values, to indicate the first node to store the first indication information, the third indication information, and the fifth indication information.

For another example, in an advertisement message sent to the second node, values of the second indication information, the fourth indication information, and the sixth indication information are all second values, to indicate the second node not to store the first indication information, the third indication information, and the fifth indication information.

For another example, in an advertisement message sent to the third node, values of the second indication information and the fourth indication information are first values, and a value of the sixth indication information is a second value, to indicate the third node to store the first indication information and the third indication information, but not the fifth indication information.

In addition, the storage indication information may not only be used to indicate whether the node stores the format indication information in the advertisement message, but may also be used to indicate whether the node stores the forwarding behavior information in the advertisement message.

For a node, after the node receives an advertisement message from the first network device, the node may determine whether an ID of the node exists in node IDs carried in the advertisement message.

If the ID of the node exists in the node IDs carried in the advertisement message, the node may store format indication information and forwarding behavior information that corresponds to the ID of the node and that are in the advertisement message, for example, store the format indication information and the forwarding behavior information in a local table (local table) of the node.

If the ID of the node does not exist in the node IDs carried in the advertisement message, the node may determine a value of storage indication information in the advertisement message. If the value of the storage indication information is the first value, the node may store format indication information and forwarding behavior information that are in the advertisement message and that correspond to the storage indication information, for example, store the format indication information and the forwarding behavior information in an adjacent table (adjacent table) of the node. If the value of the storage indication information is the second value, the node does not store format indication information and forwarding behavior information that are in the advertisement message and that correspond to the storage indication information.

For example, the following continues to use the network shown in FIG. 5 as an example for description.

Refer to FIG. 5. When the first network device has a service, the first network device may establish a communication link L2: node A→node B→node C→node D→node E→node F, and send a BGP-SRv6 policy or a PCEP message to the node A, so that the node A establishes a corresponding tunnel.

The BGP-SRv6 policy or the PCEP message may carry path information of the communication link L2, and the path information may be: SID list=<End-x_A, End-x_B, End-x_C, End-x_D, End-x_E, End-x_F>. A sequence of the node A to the node F in the SID list may indicate an upstream-downstream relationship of the node A to the node F. End-x indicates that a forwarding behavior is to send to the control plane for processing. In other words, the forwarding behaviors of the node A to the node F are to send to the control plane for processing.

Further, based on respective SIDs of the node A to the node F, in the BGP-LS message sent by the first network device to each node in the node A to the node F on the communication link L2, the first network device may carry format indication information B to format indication information F, forwarding behavior information of the node A to node E, and storage indication information corresponding to format indication information B to format indication information F.

In the BGP-LS message sent to the node A, values of storage indication information corresponding to the format indication information B to the format indication information F may be first values. In the BGP-LS message sent to the node B, a value of storage indication information corresponding to the format indication information B may be a second value, and values of storage indication information corresponding to the format indication information C to the format indication information F may be first values. In the BGP-LS message sent to the node C, values of storage indication information corresponding to the format indication information B and the format indication information C may be second values, and values of storage indication information corresponding to the format indication information D to the format indication information F may be first values. In the BGP-LS message sent to the node D, values of storage indication information corresponding to the format indication information B to the format indication information D may be second values, and values of storage indication information corresponding to the format indication information E and the format indication information F may be first values. In the BGP-LS message sent to the node E, values of storage indication information corresponding to the format indication information B to the format indication information E may be second values, and a value of storage indication information corresponding to the format indication information F may be a first value. In a BGP-LS message sent to a node other than the node A to the node E, values of storage indication information corresponding to the format indication information B to the format indication information F may be second values.

The format indication information B corresponds to a SID A of the node A, and indicates a format of a SID B of the node B. The format indication information C corresponds to the SID B of the node B, and indicates a format of a SID C of the node C. The format indication information D corresponds to the SID C of the node C, and indicates a format of a SID D of the node D. The format indication information E corresponds to the SID D of the node D, and indicates a format of a SID E of the node E. The format indication information F corresponds to the SID E of the node E, and indicates a format of a SID F of the node F.

In this way, the node A may store the format indication information B to the format indication information F and the forwarding behavior information of the node A to the node E based on the values of the storage indication information in the BGP-LS message.

In this way, for any node, the node only needs to store indication information and forwarding behavior information of the node and all nodes downstream. This saves resources and improves communication efficiency.

For example, in an example, the format indication information and the forwarding behavior information that are stored by the node A based on the advertisement message sent to the node A may be shown in the following Table 2a.

Table 2a

| Forwarding behavior information (auiSidAddr) | Format indication information (usflavor) | Description of the format indication information |
|---|---|---|
| End-x_A | 0000 0000 | The format indication information indicates that a format of a next SID of End-x_A is an uncompressed format, and occupies 128 bits. |
| End-x_B | 0000 0010 | The format indication information indicates that a format of a next SID of End-x_B is a compressed format, and a length of the SID is a default length, for example, 32 bits. |
| End-x_C | 0000 0000 | The format indication information indicates that a format of a next SID of End-x_C is an uncompressed format, and occupies 128 bits. |
| End-x_D | 0000 0010 | The format indication information indicates that a format of a next SID of End-x_D is a compressed format, and a length of the SID is a default length, for example, 32 bits. |
| End-x_E | 0000 0010 | The format indication information indicates that a format of a next SID of End-x_E is a compressed format, and a length of the SID is a default length, for example, 32 bits. | may be second values, and values of storage indication information corresponding to the format indication information D to the format indication information F may be first values. In the BGP-LS message sent to the node D, values of storage indication information corresponding to the for- For another example, in another example, information stored by the node A based on obtained SID information and format indication information corresponding to the segment identification information may be shown in the following Table 2b.

Table 2b

| Forwarding behavior information (auiSidAddr) | Format indication information (usflavor) | Description of the format indication information |
| --- | --- | --- |
| End-x_A | 0 or 128 | The format indication information: 0 or 128 indicates that a format of a next SID of End-x_A is an uncompressed format, and occupies 128 bits. |
| End-x_B | 32 | The format indication information indicates that a format of a next SID of End-x_B is a compressed format, and occupies 32 bits. |
| End-x_C | 0 or 128 | The format indication information indicates that a format of a next SID of End-x_C is an uncompressed format, and occupies 128 bits. |
| End-x_D | 16 | The format indication information indicates that a format of a next SID of End-x_D is a compressed format, and occupies 16 bits. |
| End-x_E | 64 | The format indication information indicates that a format of a next SID of End-x_D is a compressed format, and occupies 16 bits. |

The node B may store the format indication information C to the format indication information F and the forwarding behavior information of the node B to the node E based on the values of the storage indication information in the BGP-LS message.

For example, in an example, the format indication information and the forwarding behavior information that are stored by the node B based on the advertisement message sent to the node B may be shown in the following Table 3a.

Table 3a

| Forwarding behavior information (auiSidAddr) | Format indication information (usflavor) | Description of the format indication information |
| --- | --- | --- |
| End-x_B | 0000 0010 | The format indication information indicates that a format of a next SID of End-x_B is a compressed format, and a length of the SID is a default length, for example, 32 bits. |
| End-x_C | 0000 0000 | The format indication information indicates that a format of a next SID of End-x_C is an uncompressed format, and occupies 128 bits. |
| End-x_D | 0000 0010 | The format indication information indicates that a format of a next SID of End-x_D is a compressed format, and a length of the SID is a default length, for example, 32 bits. |
| End-x_E | 0000 0010 | The format indication information indicates that a format of a next SID of End-x_E is a compressed format, and a length of the SID is a default length, for example, 32 bits. |

For another example, in another example, the format indication information and the forwarding behavior information that are stored by the node B based on the advertisement message sent to the node B may be shown in the following Table 3b.

Table 3b

| Forwarding behavior information (auiSidAddr) | Format indication information (usflavor) | Description of the format indication information |
| --- | --- | --- |
| End-x_B | 32 | The format indication information indicates that a format of a next SID of End-x_B is a compressed format, and occupies 32 bits. |
| End-x_C | 0 or 128 | The format indication information indicates that a format of a next SID of End-x_C is an uncompressed format, and occupies 128 bits. |

Table 3b-continued

| Forwarding behavior information (auiSidAddr) | Format indication information (usflavor) | Description of the format indication information |
|---|---|---|
| End-x_D | 16 | The format indication information indicates that a format of a next SID of End-x_D is a compressed format, and occupies 16 bits. |
| End-x_E | 64 | The format indication information indicates that a format of a next SID of End-x_D is a compressed format, and occupies 16 bits. |

The node C may store the format indication information D to the format indication information F and the forwarding behavior information of the node C to the node E based on the values of the storage indication information in the BGP-LS message.

For example, in an example, the format indication information and the forwarding behavior information that are stored by the node C based on the advertisement message sent to the node C may be shown in the following Table 4a.

Table 4a

| Forwarding behavior information (auiSidAddr) | Format indication information (usflavor) | Description of the format indication information |
|---|---|---|
| End-x_C | 0000 0000 | The format indication information indicates that a format of a next SID of End-x_C is an uncompressed format, and occupies 128 bits. |
| End-x_D | 0000 0010 | The format indication information indicates that a format of a next SID of End-x_D is a compressed format, and a length of the SID is a default length, for example, 32 bits. |
| End-x_E | 0000 0010 | The format indication information indicates that a format of a next SID of End-x_E is a compressed format, and a length of the SID is a default length, for example, 32 bits. |

For another example, in another example, the format indication information and the forwarding behavior information that are stored by the node C based on the advertisement message sent to the node C may be shown in the following Table 4b.

Table 4b

| Forwarding behavior information (auiSidAddr) | Format indication information (usflavor) | Description of the format indication information |
|---|---|---|
| End-x_C | 0 or 128 | The format indication information indicates that a format of a next SID of End-x_C is an uncompressed format, and occupies 128 bits. |
| End-x_D | 16 | The format indication information indicates that a format of a next SID of End-x_D is a compressed format, and occupies 16 bits. |
| End-x_E | 64 | The format indication information indicates that a format of a next SID of End-x_D is a compressed format, and occupies 16 bits. |

The node D may store the format indication information E and the format indication information F and the forwarding behavior information of the node D and the node E based on the values of the storage indication information in the BGP-LS message.

For example, in an example, the format indication information and SID information that are stored by the node D based on the advertisement message sent to the node D may be shown in the following Table 5a.

Table 5a

| Forwarding behavior information (auiSidAddr) | Format indication information (usflavor) | Description of the format indication information |
|---|---|---|
| End-x_D | 0000 0010 | The format indication information indicates that a format of a next SID of End-x_D is a compressed format, and a length of the SID is a default length, for example, 32 bits. |
| End-x_E | 0000 0010 | The format indication information indicates that a format of a next SID of End-x_E is a compressed format, and a length of the SID is a default length, for example, 32 bits. |

For another example, in another example, the format indication information and SID information that are stored by the node D based on the advertisement message sent to the node D may be shown in the following Table 5b.

Table 5b

| Forwarding behavior information (auiSidAddr) | Format indication information (usflavor) | Description of the format indication information |
|---|---|---|
| End-x_D | 16 | The format indication information indicates that a format of a next SID of End-x_D is a compressed format, and occupies 16 bits. |
| End-x_E | 64 | The format indication information indicates that a format of a next SID of End-x_D is a compressed format, and occupies 16 bits. |

The node E may store the format indication information F and the forwarding behavior information of the node E based on the values of the storage indication information in the BGP-LS message.

For example, in an example, the format indication information and the forwarding behavior information that are stored by the node E based on the advertisement message sent to the node E may be shown in the following Table 6a.

Table 6a

| Forwarding behavior information (auiSidAddr) | Format indication information (usflavor) | Description of the format indication information |
|---|---|---|
| End-x_E | 0000 0010 | The format indication information indicates that a format of a next SID of End-x_E is a compressed format, and a length of the SID is a default length, for example, 32 bits. |

For another example, in another example, the format indication information and the forwarding behavior information that are stored by the node E based on the advertisement message sent to the node E may be shown in the following Table 6b.

Table 6b

| Forwarding behavior information (auiSidAddr) | Format indication information (usflavor) | Description of the format indication information |
|---|---|---|
| End-x_E | 64 | The format indication information indicates that a format of a next SID of End-x_D is a compressed format, and occupies 16 bits. |

In addition, a node other than the node A to the node E may not store the format indication information B to the format indication information F, or the forwarding behavior information of the node A to the node E based on values of storage indication information in the BGP-LS message.

B. Sending an Advertisement Message to a Specified Link:

For example, the first network device may determine, based on a SID on a communication link, format indication information corresponding to the SID, and determine forwarding behavior information of each node based on configuration information of each node on the communication link. In this way, the first network device may send the advertisement message to all nodes on the communication link, so that each node on the communication link may store corresponding format indication information and the forwarding behavior information that are in the advertisement message.

For specific implementation of sending the advertisement message to the specified link, refer to the sending of the advertisement message to the network or subnet described above.

C. Sending an Advertisement Message to a Specified Node:

For example, the first network device may determine, based on a SID of the specified node, format indication information corresponding to the SID, and determine, based on configuration information of the specified node, forwarding behavior information corresponding to the specified node. In this way, the first network device may send the advertisement message to the specified node, so that the specified node stores the corresponding format indication information and the forwarding behavior information in the advertisement message.

For specific implementation of sending the advertisement message to the specified node, refer to the sending of the advertisement message to the network or subnet described above.

Figure 6:
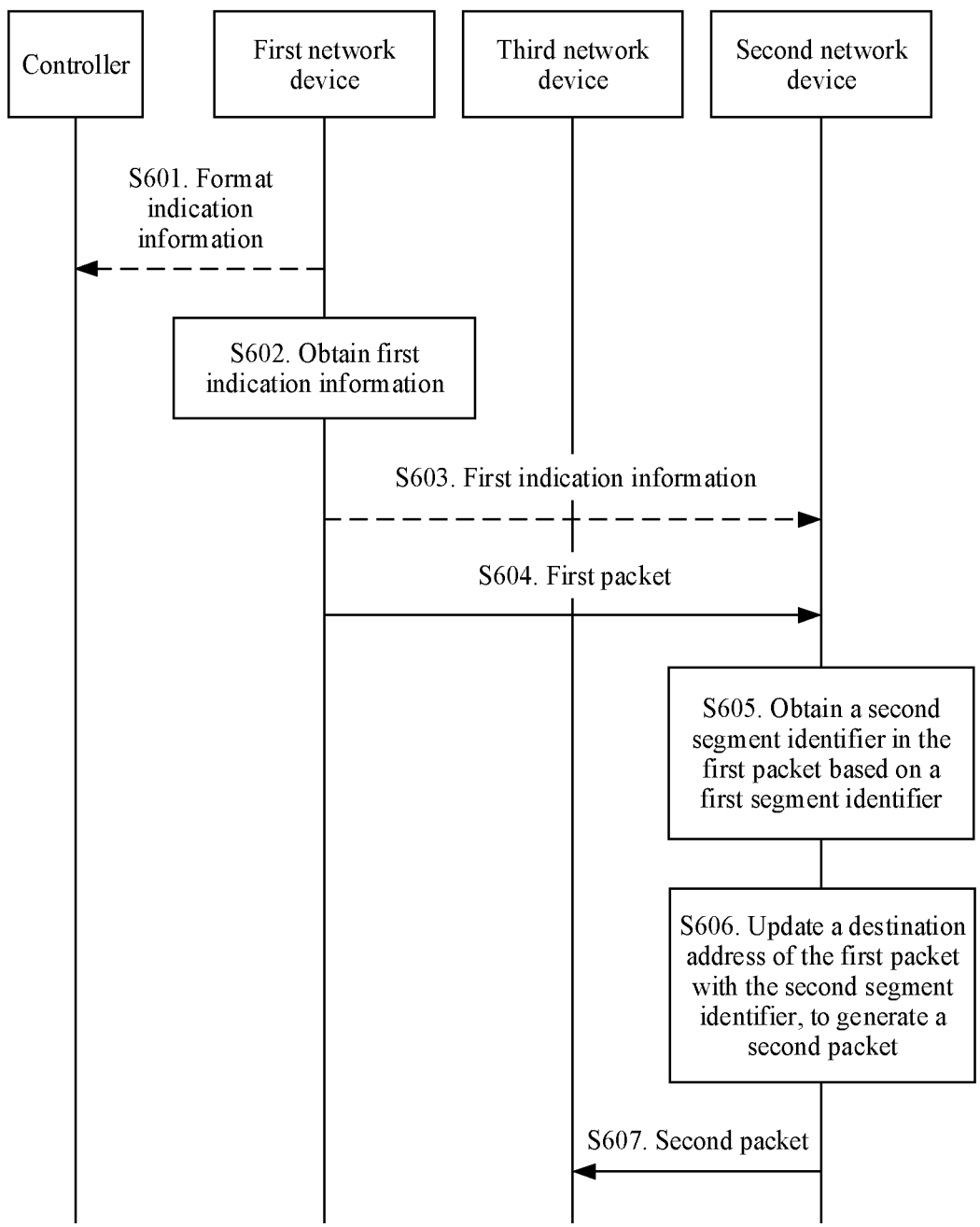
FIG. 6 is a flowchart of a communication method according to an embodiment of this application.

For example, FIG. 6 is a schematic flowchart 2 of a communication method according to an embodiment of this application. The communication method may be jointly performed by a first network device, a second network device, and a third network device, and the first network device, the second network device, and the third network device may be the nodes in the communication system shown in FIG. 3. The communication method includes the following steps.

S601. The first network device sends format indication information of the first network device to a controller.

The format indication information of the first network device corresponds to a SID of the first network device.

For specific implementation of S601, refer to S401.

S602. The first network device obtains first indication information.

Optionally, the first network device may receive and store an advertisement message from the controller. Alternatively, the first network device may receive and store an advertisement message from another node, for example, from the third network device. The advertisement message may be an IGP routing message or a BGP-LS message. The advertisement message may include format indication information. The format indication information may include one or more of the following: the first indication information, third indication information, and fifth indication information.

Optionally, the advertisement message may further include forwarding behavior information.

Optionally, the advertisement message may further include storage indication information. The storage indication information may include second indication information, fourth indication information, and sixth indication information.

In addition, for a specific implementation of S602, refer to S402.

S603. The first network device sends the first indication information to the second network device.

Optionally, after receiving routing information from another node, for example, from a third network device, or after generating routing information, the first network device may further send the routing information to another node, for example, to the second network device, so that the second network device may, based on the routing information, stores forwarding behavior information and format indication information of a downstream node.

It should be noted that, S601 and S603 are shown by dashed lines. This indicates that S601 and S603 are optional steps.

For example, the first network device performs S601, and on the basis of S601, performs the step of receiving and storing routing information from the controller in S602. In this way, by reporting of each node and delivering of the controller, the second network device may store forwarding behavior information and format indication information of a downstream node.

Alternatively, for another example, if the first network device performs the step of receiving and storing routing information from the other node in S602, and on the basis of S602, performs S603, the second network device may store the forwarding behavior information and the format indication information of the downstream node by forwarding between the nodes.

S604. The second network device receives a first packet.

As a node in the network or subnet, the second network device may receive the first packet from another node in the network or subnet, for example, from the first network device. The first packet may be an SRv6 packet.

S605. If a first SID in the first packet is unavailable, the second network device obtains a second SID in the first packet based on the first SID.

For example, a G-SRH in the first packet may support format mixing. In other words, the G-SRH may include a plurality of SIDs. Each SID may be a G-SID, a standard SID, or a compressed SID in another form.

Optionally, the SIDs in the G-SRH may include the first SID and the second SID, and the first SID and the second SID are adjacent.

The second SID may be a SID of the third network device. The first SID may be a SID of the second network device, or the first SID may be a SID of another network device, and the other network device is located between the second network device and the third network device.

In addition, the first SID and/or the second SID may be compressed SIDs, and a length of the first SID and a length of the second SID are different. In this way, a data packet size of the first packet is reduced, and resource overheads are reduced, to improve communication efficiency.

In addition, a destination address in the first packet may be in an IPv6 basic header (IPv6 basic header) in the first packet, and further, the first SID is in the destination address, to indicate that the first packet needs to be processed by a network device corresponding to the first SID.

Figure 7:
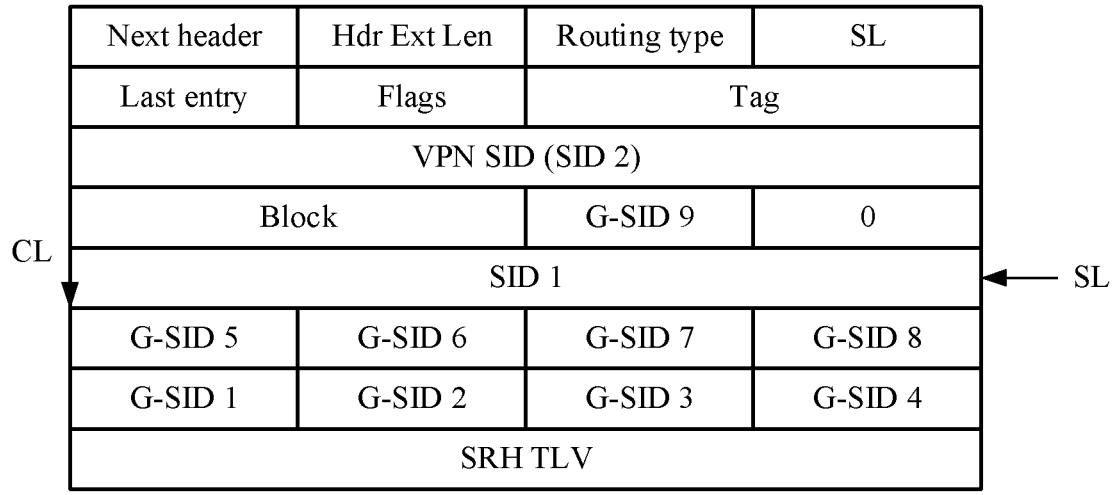
FIG. 7 is a schematic diagram of a structure of a generalized SR header (G-SRH) according to an embodiment of this application.
Figure 8:
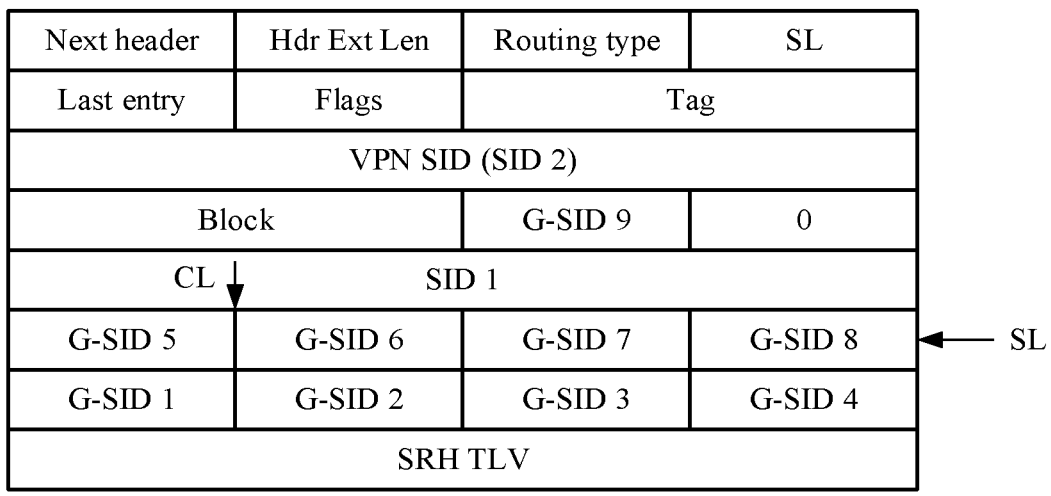
FIG. 8 is a schematic diagram of a structure of a G-SRH according to an embodiment of this application.

Further, FIG. 7 shows a structure of the G-SRH in the first packet. The G-SRH may include: a next header field, an SRH length (Hdr Ext Len) field, a routing type field, a segments left (SL) pointer, a last entry field, a flags field, a tag field, a segment routing header type length value (SRH TLV) field, a block (redundant) field, a plurality of G-SIDs, for example, a G-SID 1 to a G-SID 9, and SIDs, for example, a VPN SID and a SID 1.

The next header field may be a field of 8 bits, and may be used to indicate a type of a next packet header adjacent to the G-SRH.

The Hdr Ext Len field may be a field of 8 bits, and may be used to indicate a length of fields in the G-SRH except the next header field.

The routing type field may be a field of 8 bits, and may be used to indicate a type of the G-SRH.

A length of the SL may be 8 bits, and may be used to indicate a quantity of segments left.

The last entry field may be a field of 8 bits, and may be used to query a last entry in the segment list.

The flag field may be a reserved field of 8 bits, and may be used to indicate the network device to perform special processing, for example, perform operation, administration, and management (OAM).

The tag field may be a field of 16 bits, and may be used to identify a data packet from a same group.

The SRH TLV field may be used to carry an optional TLV argument, for example, a padding TLV and a hash-based message authentication code (HMAC) TLV.

The VPN SID is a SID used to implement a service function.

The block field may represent a duplicate and redundant part of SIDs. The destination address is updated with the block field in the previous forwarding process, and therefore only the G-SIDs may be encapsulated in the SRH, so that in a subsequent update process, the destination address may be updated only with a G-SID.

Optionally, the IPv6 basic header in the first packet may further include a compress segment left (CL) pointer, where a length of the instruction indication pointer may be 2 bits, and may be used to indicate a location at which compression instructions are being executed. In this way, a location of a compressed SID in the destination address in the G-SRH may be determined based on a joint indication of the instruction indication pointer and the segments left pointer.

Further, the second network device may determine, based on the first SID in the destination address, whether the first SID is available.

For example, if the second network device determines that the first SID is available, for example, determines that the network device corresponding to the first SID works properly, a link to the network device works properly, and the first SID works properly, the second network device may process the first packet based on forwarding behavior information corresponding to the first SID.

For another example, if the second network device determines that the first SID is unavailable, for example, determines that the network device corresponding to the first SID fails, a link to the network device fails, or an error exists in the first SID, the second network device may obtain, from the stored format indication information based on the first SID, first indication information corresponding to the first SID. In this way, the second network device can obtain the second SID from the G-SRH in the first packet based on the first indication information in a quick and accurate manner.

For example, in FIG. 7, the first SID is a SID 1 of 128 bits, and the second SID (G-SID 5 in FIG. 7) is a compressed SID of 32 bits. For example, the first indication information indicates that a next SID (G-SID 5) of the SID 1 is a compressed SID, and a length of the compressed SID is 32 bits. In this way, the second network device may obtain, based on the first indication information, data of 32 bits located behind an indication location of the CL pointer in FIG. 7. The data of 32 bits is the second SID.

It should be understood that, that the second SID is obtained based on the first indication information is merely an example provided in this embodiment of this application, and does not constitute any limitation. For example, the second network device may alternatively obtain the second SID based on a pre-established correspondence, such as a format correspondence or a location correspondence, between the first SID and the second SID.

S606. The second network device updates the destination address in the first packet with the second SID to generate a second packet.

For example, after obtaining the second SID, the second network device may update the destination address in the first packet with the second SID to obtain the second packet, and process the packet based on the second SID. For example, the second network device may forward the packet based on the second SID. In other words, TE-FRR is implemented when the compressed SID exists.

It may be understood that, because the first indication information can indicate a format of the second SID, the second network device can obtain the second SID regardless of whether the second SID is compressed, and correctly perform TE-FRR.

Optionally, because the first SID is unavailable, the second network device may further delete third indication information corresponding to the first SID to avoid information redundancy, so that resource utilization and communication efficiency are improved.

Optionally, the second network device may further update, based on the format of the second SID, an indication location of a CL pointer and/or an indication location of an SL pointer in the second packet. For example, in FIG. 7, the second network device may move the indication location of the CL pointer backward by 32 bits, to obtain a G-SRH shown in FIG. 8.

S607. The second network device processes the second packet based on the second SID.

For example, after obtaining the second packet, the second network device may determine, based on the second SID in a destination address in the second packet, whether the second SID is available.

On one hand, if the second network device determines that the second SID is available, for example, determines that the third network device that corresponds to the second SID works properly, a link to the third network device works properly, and the second SID works properly, the second network device may process the second packet based on forwarding behavior information corresponding to the second SID, for example, transparently transmit the second packet to the third network device by using a data plane, or send the second packet to a control plane for processing and then send the processed second packet to the third network device.

On the other hand, if the second network device determines that the second SID is unavailable, for example, determines that the third network device that corresponds to the second SID fails, a link to the third network device fails, or an error exists in the second SID, the second network device may determine whether the second SID is the last SID on a communication link.

Optionally, if the second SID is not the last SID on the communication link, the second network device may iteratively perform S604 to S606, to be specific, obtain, based on the second SID, a SID located behind the second SID, and update the destination address in the second packet with the SID located behind the second SID, to obtain a third packet, and so on.

Alternatively, optionally, if the second SID is the last SID on the communication link, the second network device may discard the second packet.

It should be understood that, the foregoing functions implemented by or the foregoing steps performed by the first network device, the second network device, and the third network device are not limited. For example, the first network device may also implement the foregoing functions of the second network device or the third network device, and perform the foregoing steps of the second network device or the third network device. The second network device may also implement the foregoing functions of the first network device or the third network device, and perform the foregoing steps of the first network device or the third network device. The third network device may implement the foregoing functions of the first network device or the second network device, and perform the foregoing steps of the first network device or the second network device.

For example, the following continues to use the network shown in FIG. 5 as an example for description.

First, node C receives a packet from node B. A SID in a destination address in the packet is a SID of node D. If node C determines that the SID of node D is unavailable, node C may obtain a SID of node E in a G-SRH in the packet based on format indication information corresponding to the SID of node D, and update the destination address in the packet with the SID of the node E.

Then, if node C determines that the SID of node E is available, node C may send the packet to node E, for example, send the packet to node E via node J. Alternatively, if node C determines that the SID of node E is unavailable, node C may obtain a SID of node F in the G-SRH in the packet based on format indication information corresponding to the SID of node E, and update the destination address in the packet with the SID of the node F.

Finally, if node C determines that the SID of node F is available, node C may send the packet to node F, for example, send the packet to node F via node J and node K. Alternatively, if node C determines, through traversing a routing table, that the SID of node F is unavailable, node C discards the packet.

It may be understood that, according to the communication method shown in any one of FIG. 3 to FIG. 8, because the second network device can obtain the second SID based on the first SID that is unavailable, the second network device properly updates the destination address in the first packet with the second SID, to obtain the second packet. In this way, the second network device can further process the second packet based on the second SID, thus enabling an SRv6 packet to be further when a SID is unavailable, and therefore, improving communication reliability.

Figure 9:
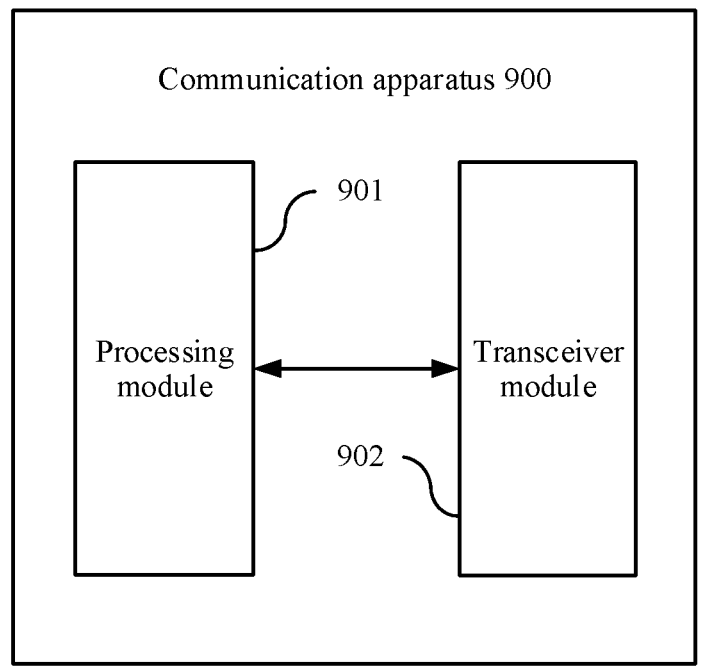
FIG. 9 is a schematic diagram of a structure of a communication apparatus according to an embodiment of this application.
Figure 10:
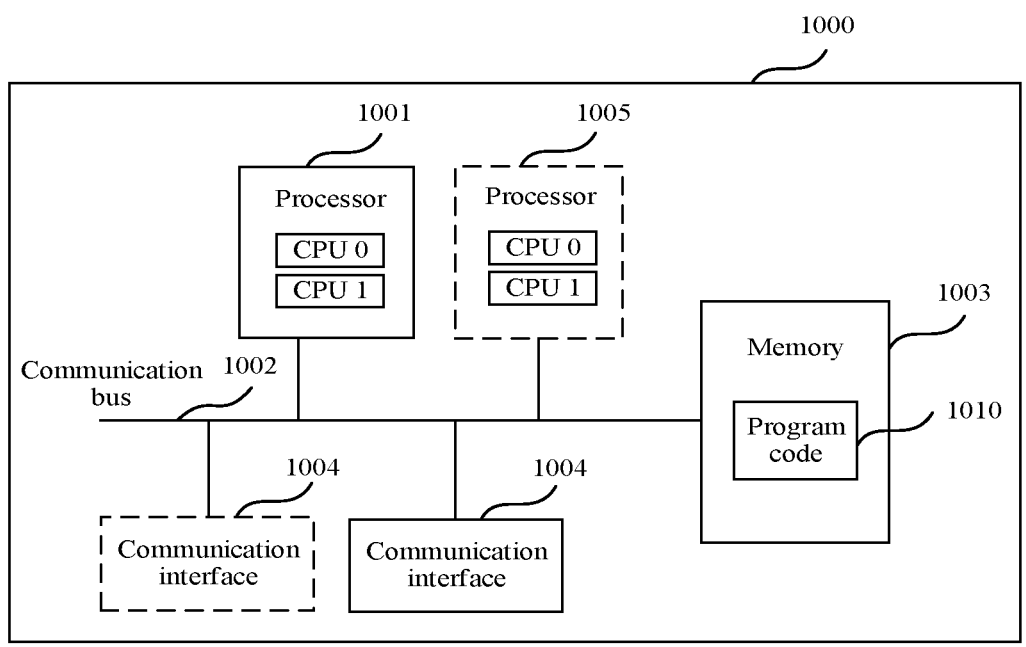
FIG. 10 is a schematic diagram of a structure of a communication apparatus according to an embodiment of this application.
Figure 11:
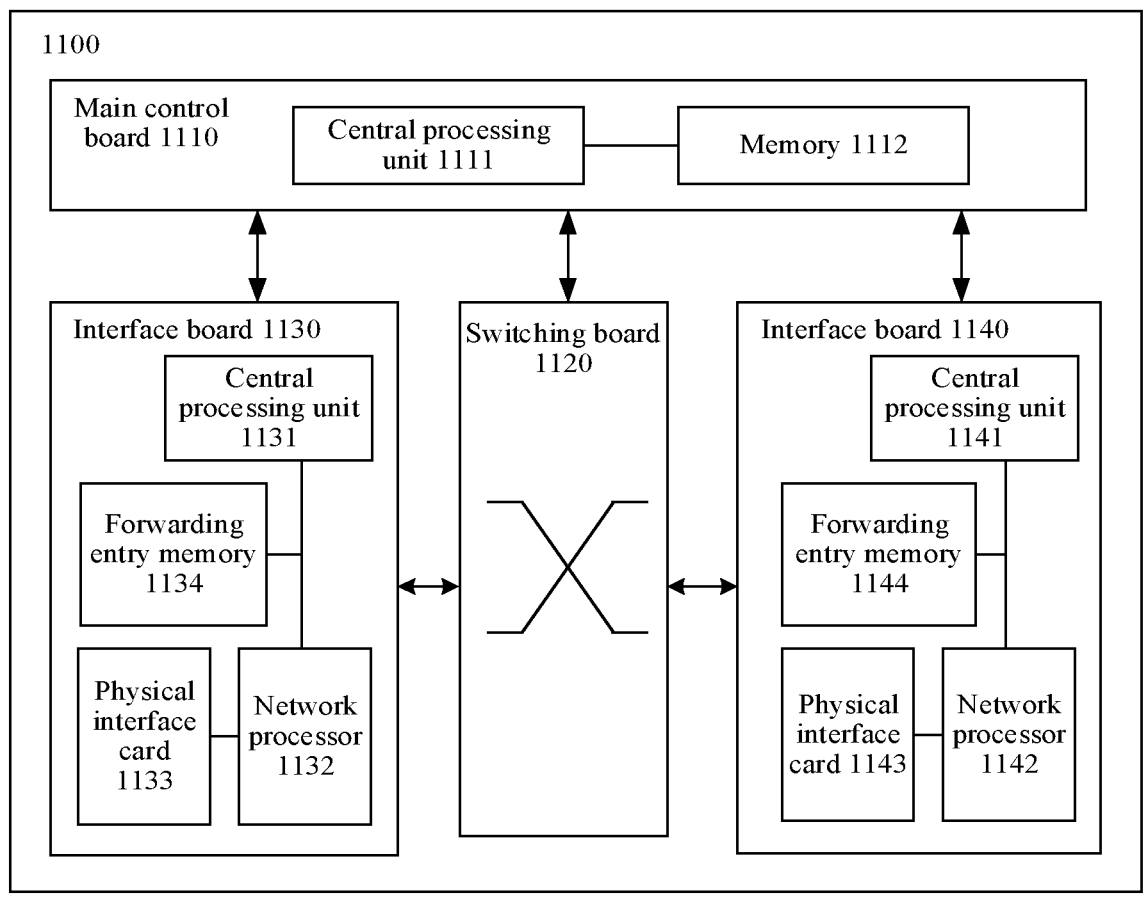
FIG. 11 is a schematic diagram of a structure of a communication apparatus according to an embodiment of this application.

The communication method provided in the embodiments of this application is described above in detail with reference to FIG. 4 to FIG. 8. With reference to FIG. 9 to FIG. 11, the following describes in detail communication apparatuses configured to perform the communication method provided in the embodiments of this application.

FIG. 9 a schematic structural diagram of a communication apparatus 900 according to an embodiment of this application. The apparatus 900 may include a processing module 901 and a transceiver module 902.

In some embodiments, the apparatus 900 may correspond to the first network device in the foregoing method embodiment 400, for example, the controller or the node in the communication network, and have any function of the first network device in the foregoing method 400.

Optionally, the processing module 901 is configured to perform S401.

Optionally, the transceiver module 902 is configured to perform S402.

The modules in the apparatus 900 and the foregoing other operations and/or functions are respectively used to implement various steps and methods implemented by the first network device in the method embodiment 400. For specific details, refer to the foregoing method 400. Details are not described herein again for brevity.

When the apparatus 900 obtains and sends the format indication information, division into the foregoing functional modules is used as an example for description. In actual application, the foregoing functions may be allocated to different functional modules for implementation based on a requirement, in other words, an internal structure of the apparatus 900 is divided into different functional modules, to complete all or part of the functions described above. In addition, the apparatus 900 provided in the foregoing embodiment and the method 400 are based on a same concept. For a specific implementation process of the apparatus 900, refer to the method 400.

In some other embodiments, the apparatus 900 may correspond to the first network device in the foregoing method embodiment 600, for example, the node in the communication network, and have any function of the first network device in the foregoing method 600.

Optionally, the transceiver module 902 is configured to perform S601.

Optionally, the processing module 901 is configured to perform S602 and S603.

The apparatus 900 corresponds to the first network device in the foregoing method embodiment 600. For example, the node in the communication network. The modules in the apparatus 900 and the foregoing other operations and/or functions are used to implement various steps and methods implemented by the first network device in the method embodiment 600. For specific details, refer to the foregoing method 600.

When the apparatus 900 processes a packet, division into the foregoing functional modules is used as an example for description. In actual application, the foregoing functions may be allocated to different functional modules for implementation based on a requirement, in other words, an internal structure of the apparatus 900 is divided into different functional modules, to complete all or part of the functions described above. In addition, the apparatus 900 provided in the foregoing embodiment and the method 600 are based on a same concept. For a specific implementation process of the apparatus 900, refer to the method 600.

Corresponding to the method embodiment and the virtual apparatus embodiment provided in this application, an embodiment of this application further provides a communication apparatus. The following describes a hardware structure of the communication apparatus.

The communication apparatus 1000 described below corresponds to the first network device in the foregoing method embodiments. Hardware and modules in the communication apparatus 1000 and the foregoing other operations and/or functions are used to implement various steps and methods implemented by the communication apparatus 1000 in the method embodiments. For a detailed procedure of how the communication apparatus 1000 obtains and sends format indication information and processes a packet, refer to the foregoing method embodiments for specific details.

The steps in the foregoing method 400 or method 600 are completed by using an integrated logic circuit of hardware in a processor of the communication apparatus 1000 or by using instructions in a form of software. The steps in the method disclosed with reference to the embodiments of this application may be directly performed by a hardware processor, or may be performed by using a combination of hardware in the processor and a software module. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in a memory, and the processor reads information in the memory and completes the steps in the foregoing methods in combination with the hardware of the processor.

The communication apparatus 1000 corresponds to the apparatus 900 in the foregoing virtual apparatus embodiment, and each functional module in the apparatus 900 is implemented by using software of the communication apparatus 1000. In other words, the functional modules included in the apparatus 900 are generated through reading, by the processor of the communication apparatus 1000, of program code stored in the memory.

FIG. 10 is a schematic structural diagram of a communication apparatus 1000 according to an example embodiment of this application. The communication apparatus 1000 may be configured to be the controller or the node in the communication network. The communication apparatus 1000 may be implemented by a general bus architecture.

The communication apparatus 1000 includes at least one processor 1001, a communication bus 1002, a memory 1003, and at least one communication interface 1004.

The processor 1001 may be a general-purpose central processing unit (CPU), a network processor (NP), a microprocessor, or may be one or more integrated circuits configured to implement the solutions of this application, for example, an application-specific integrated circuit (ASIC), a programmable logic device (PLD), or a combination thereof. The PLD may be a complex PLD (CPLD), a field-programmable logic gate array (FPGA), a generic array logic (GAL), or any combination thereof.

The communication bus 1002 is configured to transmit information between the foregoing components. The communication bus 1002 may be classified into an address bus, a data bus, a control bus, and the like. For ease of representation, only one thick line is used to represent the bus in the figure, but this does not mean that there is only one bus or only one type of bus.

The memory 1003 may be a ROM or another type of static storage device that can store static information and instructions, or may be a RAM or another type of dynamic storage device that can store information and instructions, or may be an EEPROM, a compact disc (CD) ROM (CD-ROM) or another CD storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of instructions or a data structure and that can be accessed by a computer, but is not limited thereto. The memory 1003 may exist independently, and be connected to the processor 1001 by using the communication bus 1002. Alternatively, the memory 1003 may be integrated with the processor 1001.

The communication interface 1004 uses any apparatus of a transceiver type, such as a receiver, a transmitter, an integrated transceiver circuit, and an interface circuit, and may be configured to communicate with another device or a communication network. The communication interface 1004 includes a wired communication interface (shown by a solid line in FIG. 10), and may further include a wireless communication interface (shown by a dashed line in FIG. 10). The wired communication interface may be, for example, an Ethernet interface. The Ethernet interface may be an optical interface, an electrical interface, or a combination thereof. The wireless communication interface may be a wireless local area network (WLAN) interface, a cellular network communication interface, a combination thereof, or the like.

During specific implementation, in an embodiment, the processor 1001 may include one or more CPUs, for example, CPU 0 and CPU 1 shown in FIG. 10.

During specific implementation, in an embodiment, the communication apparatus 1000 may include a plurality of processors, such as the processor 1001 and a processor 1005 in FIG. 10. Each of these processors may be a single-core processor (single-CPU) or a multi-core processor (multi-CPU). The processor herein may be one or more devices, circuits, and/or processing cores configured to process data (for example, computer program instructions).

During specific implementation, in an embodiment, the communication apparatus 1000 may further include an output device 1006 and an input device 1007 (not shown in FIG. 10). The output device 1006 communicates with the processor 1001, and may display information in a plurality of manners. For example, the output device 1006 may be a liquid-crystal display (LCD), a light-emitting diode (LED) display device, a cathode-ray tube (CRT) display device, or a projector. The input device 1007 communicates with the processor 1001, and may receive user input in a plurality of manners. For example, the input device 1007 may be a mouse, a keyboard, a touchscreen device, or a sensing device.

In some embodiments, the memory 1003 is configured to store program code 1100 for executing the solutions in this application, and the processor 1001 may execute the program code 1100 stored in the memory 1003. In other words, the communication apparatus 1000 may implement the method 400 or the method 600 provided in the method embodiments by using the processor 1001 and the program code 1010 in the memory 1003.

The communication apparatus 1000 in this embodiment of this application may correspond to the first network device in the foregoing method embodiments, and the processor 1001, the communication interface 1004, and the like in the communication apparatus 1000 may implement functions of the device and/or various implemented steps and methods in the foregoing method embodiments.

The transceiver module 902 in the apparatus 900 may be equivalent to the communication interface 1004 in the communication apparatus 1000. The processing module 901 in the apparatus 900 may be equivalent to the processor 1001 in the communication apparatus 1000.

FIG. 11 is a schematic diagram of a structure of a communication apparatus 1100 according to an example embodiment of this application. The communication apparatus 1100 may be configured to be the controller or the node in the communication network. The communication apparatus 1100 includes a main control board 1110 and an interface board 1130.

The main control board 1110 is also referred to as a main processing unit (MPU) or a route processing card. The main control board 1110 is configured to control and manage components in the communication apparatus 1100, including route computation, device management, device maintenance, and protocol processing functions. The main control board 1110 includes a central processing unit 1111 and a memory 1112.

The interface board 1130 is also referred to as a line processing unit (LPU), a line card, or a service board. The interface board 1130 is configured to provide various service interfaces, and forward a data packet. The service interfaces include but are not limited to an Ethernet interface, a Packet over synchronous optical networking (SONET)/synchronous digital hierarchy (SDH) (POS) interface, and the like. The Ethernet interface is, for example, a flexible Ethernet service interface (Flexible Ethernet Clients (FlexE Clients)). The interface board 1130 includes a central processing unit 1131, a network processor 1132, a forwarding entry memory 1134, and a physical interface card (PIC) 1133.

The central processing unit 1131 on the interface board 1130 is configured to control and manage the interface board 1130 and communicate with the central processing unit 1111 on the main control board 1110.

The network processor 1132 is configured to implement packet forwarding processing. A form of the network processor 1132 may be a forwarding chip. Further, the network processor 1132 is configured to forward a received packet based on a forwarding table stored in the forwarding entry memory 1134. If a destination address in the packet is an address of the communication apparatus 1100, the network processor 1132 sends the packet to a CPU (for example, a central processing unit 1111) for processing. If a destination address in the packet is not an address of the communication apparatus 1100, the network processor 1132 searches for, based on the destination address, a next hop and an outbound interface corresponding to the destination address in the forwarding table, and forwards the packet to the outbound interface corresponding to the destination address. An uplink packet is processed as follows. An inbound interface of the packet is processed, and the forwarding table is searched. A downlink packet is processed as follows. The forwarding table is searched.

The physical interface card 1133 is configured to implement an interconnection function at a physical layer. Original traffic enters the interface board 1130 from the physical interface card 1133, and a processed packet is sent from the physical interface card 1133. The physical interface card 1133, also referred to as a subcard, may be installed on the interface board 1130, and is responsible for converting an optical/electrical signal into a packet, performing validity check on the packet, and forwarding the packet to the network processor 1132 for processing. In some embodiments, a central processing unit may also perform a function of the network processor 1132, for example, implement software forwarding based on a general CPU. Therefore, the network processor 1132 is not necessary in the physical interface card 1133.

Optionally, the communication apparatus 1100 includes a plurality of interface boards. For example, the communication apparatus 1100 further includes an interface board 1140. The interface board 1140 includes a central processing unit 1141, a network processor 1142, a forwarding entry memory 1144, and a physical interface card 1143.

Optionally, the communication apparatus 1100 further includes a switching board 1120. The switching board 1120 may also be referred to as a switch fabric unit (SFU). When the communication apparatus 1100 has a plurality of interface boards 1130, the switching board 1120 is configured to complete data exchange between the interface boards. For example, the interface board 1130 and the interface board 1140 may communicate with each other by using the switching board 1120.

The main control board 1110 is coupled to the interface board 1130. For example, the main control board 1110, the interface board 1130 and the interface board 1140, and the switching board 1120 are connected to a system backboard by using a system bus for interworking. In a possible implementation, an inter-process communication (IPC) channel is established between the main control board 1110 and the interface board 1130, and the main control board 1110 and the interface board 130 communicate with each other through the IPC channel.

Logically, the communication apparatus 1100 includes a control plane and a forwarding plane. The control plane includes the main control board 1110 and the central processing unit 1131. The forwarding plane includes components used for forwarding, for example, the forwarding entry memory 1134, the physical interface card 1133, and the network processor 1132. The control plane performs functions such as a function of a router, generating a forwarding table, processing signaling and protocol packets, and configuring and maintaining a status of a device. The control plane delivers the generated forwarding table to the forwarding plane. On the forwarding plane, the network processor 1132 searches the forwarding table delivered by the control plane to forward a packet received by the physical interface card 1133. The forwarding table delivered by the control plane may be stored in the forwarding entry memory 1134. In some embodiments, the control plane and the forwarding plane may be completely separated, and are not on a same device.

If the communication apparatus 1100 is configured to be the controller, the physical interface card 1133 receives format indication information from each node, and sends the format indication information to the network processor 1132. The network processor 1132 sends, to each node based on the format indication information, format indication information corresponding to the node by using the physical interface card 1133, so that the corresponding node obtains a format of a SID of a downstream node.

If the communication apparatus 1100 is configured to be the node, on one hand, the physical interface card 1133 receives format indication information of another node, and sends the format indication information to the network processor 1132 for storage, and the network processor 1132 forwards the format indication information to a corresponding node by using the physical interface card 1133. On the other hand, the physical interface card 1133 receives a first packet from another node, and sends the first packet to the network processor 1132, so that the network processor 1132 processes the first packet based on a format of a SID of a downstream node.

The transceiver module 902 in the apparatus 900 is equivalent to the physical interface card 1133 in the communication apparatus 1100. The processing module 901 in the apparatus 900 may be equivalent to the network processor 1132 or the central processing unit 1111.

Operations performed on the interface board 1140 are consistent with the operations performed on the interface board 1130 in this embodiment of this application. The communication apparatus 1100 in this embodiment may correspond to the first network device in the foregoing method embodiments, and the main control board 1110, the interface board 1130, and/or the interface board 1140 in the communication apparatus 1100 may implement functions of the first network device in the foregoing method embodiments and/or various steps implemented by the first network device in the foregoing method embodiments.

It should be noted that, there may be one or more main control boards. When there is a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or one or more switching boards. When there is a plurality of switching boards, load sharing and redundancy backup may be implemented by the switching boards together. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. To be specific, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a relatively weak data exchange and processing capability. A specific architecture to be used depends on a specific networking deployment scenario. This is not limited herein.

In some possible embodiments, the first network device may be implemented as a virtualized device.

For example, the virtualized device may be a virtual machine (VM) on which a program having a packet sending function runs, and the virtual machine is deployed on a hardware device (for example, a physical server). The virtual machine is a complete computer system that is simulated by software, that has a complete hardware system function, and that runs in a completely isolated environment. The virtual machine may be configured to be the first network device or the second network device. For example, the first network device may be implemented based on a general-purpose physical server in combination with a network functions virtualization (NFV) technology. The first network device is a virtual host, a virtual router, or a virtual switch. After reading this application, with reference to the NFV technology, a person skilled in the art may virtualize, on the general physical server, the first network devices having the foregoing functions.

For example, the virtualization device may be a container, and the container is an entity used to provide an isolated virtualization environment. For example, the container may be a docker container. The container may be configured to be the first network device. For example, the first network device may be created by using a corresponding image. For example, one container instance may be created for a proxy-container (a container that provides a proxy service) by using an image of the proxy-container, for example, a container instance proxy-container1, and the container instance proxy-container1 is provided as the first network device. When a container technology is used for implementation, the first network device may run based on a kernel of a physical machine, and a plurality of first network devices may share an operating system of a physical machine. Different first network devices may be isolated by using the container technology. A containerized first network device may run in a virtualized environment, for example, may run in a virtual machine, or the containerized first network device may directly run in a physical machine.

For example, the virtualization device may be a pod. The pod is a basic unit of Kubernetes (K8s) (K8s is an open-source container orchestration engine of GOOGLE™) for deploying, managing, and orchestrating a containerized application. The pod may include one or more containers. Generally, each container in a same pod is deployed on a same host. Therefore, each container in the same pod may communicate with each other via the host, and may share storage resources and network resources of the host. The Pod may be configured to be the first network device. For example, a container as a service (CaaS is a container-based platform as a service (PaaS)) may be instructed to create a pod, and provide the pod as a routing management device or an AS management device.

Certainly, the first network device may alternatively be another virtualization device. This is not enumerated herein one by one.

In some possible embodiments, the first network device may alternatively be implemented by a general-purpose processor. For example, a form of the general-purpose processor may be a chip. Further, the general-purpose processor implementing the first network device includes a processing circuit, and an inbound interface and an outbound interface that are internally connected to and communicated with the processing circuit. The processing circuit is configured to perform the packet generation step in the foregoing method embodiments by using the inbound interface. The processing circuit is configured to perform the receiving step in the foregoing method embodiments by using the inbound interface. The processing circuit is configured to perform the sending step in the foregoing method embodiments by using the outbound interface. Optionally, the general-purpose processor may further include a storage medium. The processing circuit is configured to perform, via the storage medium, storage steps in the foregoing method embodiments. The storage medium may store instructions executed by the processing circuit. The processing circuit is configured to execute the instructions stored in the storage medium, to perform the foregoing method embodiments.

Figure 12:
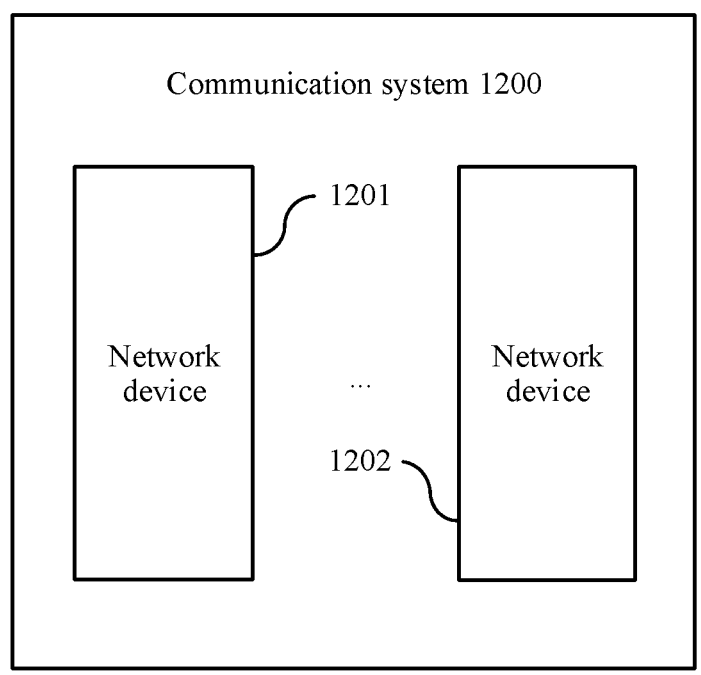
FIG. 12 is a schematic diagram of an architecture of a communication system according to an embodiment of this application.

Referring to FIG. 12, an embodiment of this application provides a communication system 1200. The system 1200 includes a network device 1201 and a network device 1202. Optionally, the network device 1201 or the network device 1202 may be any device in the apparatus 900, the apparatus 1000, or the apparatus 1100. In an example, the network device 1201 is configured to perform the method performed by the first network device in the method embodiment shown in FIG. 4, or configured to perform the method performed by the first network device controller in the method embodiment shown in FIG. 6. The network device 1202 is configured to perform the method performed by the second network device in the method embodiment shown in FIG. 6.

An embodiment of this application provides a computer program product. When the computer program product is run on a computer, the computer performs the method 400 or the method 600 in the foregoing method embodiments.

The apparatuses in the foregoing product forms separately have any function of the first network device in the foregoing method embodiments.

A person of ordinary skill in the art may be aware that, in combination with the examples described in the embodiments disclosed in this specification, method steps and units can be implemented by electronic hardware, computer software, or a combination thereof. To clearly describe the interchangeability between the hardware and the software, the foregoing has generally described steps and composition of each embodiment according to functions. Whether the functions are performed by hardware or software depends on a particular application and a design constraint condition of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatuses, and units, refer to a corresponding process in the foregoing method embodiments.

In the several embodiments provided in this application, the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may be connections in an electrical form, a mechanical form, or another form.

The units described as separate parts may or may not be physically separate, and parts displayed as units may or may not be physical units, may be located in one place, or may be distributed onto a plurality of network units. Some or all of the units may be selected according to actual requirements to achieve the objectives of the solutions of the embodiments in this application.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for indicating a computer device (which may be a personal computer, a server, or a network device) to perform all or some of the steps in the method described in the embodiments of this application. The foregoing storage medium includes any medium that can store program code, for example, a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used to implement the embodiments, all or some of the embodiments may be implemented in a form of computer program product. The computer program product includes one or more computer program instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A first network device comprising:
at least one processor; and
one or more memories coupled to the at least one processor and configured to store instructions for execution by the at least one processor, wherein when executed by the at least one processor, the instructions cause the first network device to:
receive a first packet comprising a first segment identifier (SID) and a second SID;
receive an advertisement message carrying first indication information corresponding to the first SID;
obtain the first indication information corresponding to the first SID, wherein the first indication information indicates a format of the second SID and the first indication information is used to indicate a length of the second SID, or used to indicate whether the second SID is compressed, wherein the advertisement message further carries second indication information, and wherein the second indication information instructs the first network device to store the first indication information;
determine that the first SID is unavailable when a second network device corresponding to the first SID fails, a link to the second network device fails, or an error exists in the first SID;
obtain the second SID from the first packet based on the first SID and the first indication information in response to determining that the first SID is unavailable;
update a destination address in the first packet with the second SID to generate a second packet; and
process the second packet based on the second SID.

2. The first network device of claim 1, wherein a first length of the first SID and a second length of the second SID are different.

3. The first network device of claim 1, wherein the first SID and the second SID are compressed SIDs.

4. The first network device of claim 1, wherein the advertisement message further carries third indication information and fourth indication information, wherein the third indication information indicates a format of the first SID, and wherein the fourth indication information instructs the first network device to store the third indication information.

5. The first network device of claim 1, wherein the advertisement message comprises a Border Gateway Protocol-Link State (BGP-LS) message or an Interior Gateway Protocol (IGP) routing message.

6. The first network device of claim 1, wherein the second SID is of a third network device, and wherein when executed by the at least one processor, the instructions further cause the first network device to send the second packet to the third network device based on the second SID.

7. The first network device of claim 1, wherein the first SID is a compressed SID.

8. The first network device of claim 1, wherein the second SID is a compressed SID.

9. A communication system comprising:
a second network device; and
a first network device comprising:
a memory configured to store instructions; and a processor coupled to the memory and configured to execute the instructions to cause the first network device to:
receive, from the second network device, a first packet comprising a first segment identifier (SID) and a second SID;
receive an advertisement message carrying first indication information corresponding to the first SID;
obtain the first indication information corresponding to the first SID, wherein the first indication information indicates a format of the second SID and the first indication information is used to indicate a length of the second SID, or used to indicate whether the second SID is compressed, wherein the advertisement message further carries second indication information, and wherein the second indication information instructs the first network device to store the first indication information;
determine that the first SID is unavailable when a third network device corresponding to the first SID fails, a link to the second network device fails, or an error exists in the first SID;
obtain the second SID from the first packet based on the first SID and the first indication information in response to determining that the first SID is unavailable;
update a destination address in the first packet with the second SID to generate a second packet; and
process the second packet based on the second SID.

* * * * *